(12) United States Patent
Mitsubayashi

(10) Patent No.: US 8,762,616 B2
(45) Date of Patent: Jun. 24, 2014

(54) BUS SYSTEM AND BRIDGE CIRCUIT CONNECTING BUS SYSTEM AND CONNECTION APPARATUS

(75) Inventor: Hideki Mitsubayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 243 days.

(21) Appl. No.: 13/067,596

(22) Filed: Jun. 13, 2011

(65) Prior Publication Data

US 2012/0047306 A1 Feb. 23, 2012

(30) Foreign Application Priority Data

Aug. 19, 2010 (JP) ................................. 2010-183762

(51) Int. Cl.
*G06F 13/36* (2006.01)

(52) U.S. Cl.
USPC .............. 710/306; 710/39; 710/112; 710/311

(58) Field of Classification Search
CPC .................................................. G06F 13/4027
USPC .................... 710/110, 302, 305–315, 39, 112
See application file for complete search history.

(56) References Cited

U.S. PATENT DOCUMENTS

| | | | | |
|---|---|---|---|---|
| 5,386,567 A * | 1/1995 | Lien et al. | ..................... | 713/100 |
| 5,533,204 A * | 7/1996 | Tipley | ........................... | 710/108 |
| 6,141,711 A * | 10/2000 | Shah et al. | ..................... | 710/302 |
| 6,170,030 B1 * | 1/2001 | Bell | .............................. | 710/310 |
| 6,185,642 B1 * | 2/2001 | Beukema et al. | ............... | 710/60 |
| 6,330,630 B1 * | 12/2001 | Bell | .............................. | 710/312 |
| 6,574,695 B1 * | 6/2003 | Mott et al. | ..................... | 710/302 |
| 6,715,023 B1 * | 3/2004 | Abu-Lebdeh et al. | ........ | 710/317 |
| 6,754,737 B2 * | 6/2004 | Heynemann et al. | ........... | 710/39 |
| 6,757,772 B2 * | 6/2004 | Ono | ............................... | 710/302 |
| 6,766,386 B2 * | 7/2004 | Dobson et al. | .................. | 710/39 |
| 6,968,416 B2 * | 11/2005 | Moy | ............................. | 710/310 |
| 6,981,173 B2 * | 12/2005 | Ferguson et al. | ............ | 714/5.11 |
| 7,234,014 B2 * | 6/2007 | Molander et al. | ............. | 710/302 |
| 7,308,522 B2 * | 12/2007 | Heynemann et al. | ......... | 710/310 |
| 7,594,043 B2 * | 9/2009 | Cornwell et al. | .............. | 710/33 |
| 7,802,043 B2 * | 9/2010 | Hauck et al. | .................. | 710/304 |
| 7,834,867 B2 * | 11/2010 | Sprague et al. | ............... | 345/204 |
| 8,380,905 B2 * | 2/2013 | Djabbari et al. | .............. | 710/110 |
| 2003/0023410 A1 * | 1/2003 | Roth | ............................. | 702/188 |

(Continued)

FOREIGN PATENT DOCUMENTS

| | | |
|---|---|---|
| JP | 03-006723 | 1/1991 |
| JP | 11-212687 | 8/1999 |

(Continued)

OTHER PUBLICATIONS

Intel Corporation. Split Transaction Feature for the Intel PXA27x Processor Family. Application Note. Oct. 2004.*

(Continued)

*Primary Examiner* — Matthew D Spittle
(74) *Attorney, Agent, or Firm* — Rader, Fishman & Grauer PLLC

(57) ABSTRACT

A bus system includes: a first connection apparatus and a second connection apparatus carrying-out an exchange in accordance with a predetermined protocol; a bus through which the first and second connection apparatuses are connected to each other; and a bridge inserted between the first connection apparatus and the bus, and carrying out an exchange with the second connection apparatus in accordance with the predetermined protocol instead of the first connection apparatus when receiving a disconnection instruction for the first connection apparatus.

9 Claims, 19 Drawing Sheets

(56) References Cited

U.S. PATENT DOCUMENTS

| | | | |
|---|---|---|---|
| 2003/0046473 A1* | 3/2003 | Dobson et al. | 710/306 |
| 2004/0221075 A1* | 11/2004 | Dobson et al. | 710/39 |
| 2004/0225823 A1* | 11/2004 | Heynemann et al. | 710/310 |
| 2007/0136528 A1* | 6/2007 | Hauck et al. | 711/115 |

FOREIGN PATENT DOCUMENTS

| | | |
|---|---|---|
| JP | 2002-269033 | 9/2002 |
| JP | 2003-288278 A | 10/2003 |
| JP | 2008-250632 A | 10/2008 |

OTHER PUBLICATIONS

Intel Corporation. 21555 Non-Transparent PCI-to-PCI Bridge Performance Optimization. Application Note. May 2001.*

Japanese Office Action issued Feb. 25, 2014 for corresponding Japanese Application No. 2010-183762.

* cited by examiner

FIG.3

| SIGNAL NAME | SOURCE | EXPLANATION |
|---|---|---|
| ARID [3:0] | MASTER | READ ADDRESS IDENTIFIER |
| ARADDR [31:0] | MASTER | READ ADDRESS |
| ARLEN [3:0] | MASTER | BURST LENGTH |
| ARSIZE [2:0] | MASTER | BURST SIZE |
| ARBURST [1:0] | MASTER | BURST TYPE |
| ARLOCK [1:0] | MASTER | LOCK TYPE |
| ARCACHE [3:0] | MASTER | CACHE TYPE |
| ARPROT [2:0] | MASTER | PROTECTION TYPE |
| ARVALID | MASTER | READ ADDRESS VALID |
| ARREADY | SLAVE | READ ADDRESS READY |

FIG.4

| SIGNAL NAME | SOURCE | EXPLANATION |
|---|---|---|
| RID [3:0] | SLAVE | READ IDENTIFIER TAG |
| RDATA [31:0] | SLAVE | READ DATA |
| RRESP [1:0] | SLAVE | READ RESPONSE |
| RLAST | SLAVE | READ LAST (FINAL TRANSFER WITHIN BURST) |
| RVALID | SLAVE | READ VALID |
| RREADY | MASTER | READ READY |

FIG.5

| SIGNAL NAME | SOURCE | MEANING |
|---|---|---|
| AWID [3:0] | MASTER | WRITE ADDRESS IDENTIFIER |
| AWADDR [31:0] | MASTER | WRITE ADDRESS |
| AWLEN [3:0] | MASTER | BURST LENGTH |
| AWSIZE [2:0] | MASTER | BURST SIZE |
| AWBURST [1:0] | MASTER | BURST TYPE |
| AWLOCK [1:0] | MASTER | LOCK TYPE |
| AWCACHE [3:0] | MASTER | CACHE TYPE |
| AWPROT [2:0] | MASTER | PROTECTION TYPE |
| AWVALID | MASTER | WRITE ADDRESS VALID |
| AWREADY | SLAVE | WRITE ADDRESS READY |

FIG.6

| SIGNAL NAME | SOURCE | EXPLANATION |
|---|---|---|
| WID [3:0] | MASTER | WRITE IDENTIFIER TAG |
| WDATA [31:0] | MASTER | WRITE DATA |
| WSTRB [3:0] | MASTER | WRITE STROBE |
| WLAST | MASTER | WRITE LAST (FINAL TRANSFER WITHIN BURST) |
| WVALID | MASTER | WRITE VALID |
| WREADY | SLAVE | WRITE READY |

F I G . 7

| SIGNAL NAME | SOURCE | EXPLANATION |
|---|---|---|
| BID [:0] | SLAVE | RESPONSE IDENTIFIER |
| BRESP [:0] | SLAVE | WRITE RESPONSE |
| BVALID | SLAVE | WRITE RESPONSE VALID |
| BREADY | MASTER | RESPONSE READY |

F I G . 9

| CYCLE: (-1) INPUT | | CYCLE: (t) OUTPUT |
|---|---|---|
| S | R | Q [t] |
| 0 | 0 | Q [-1] |
| 0 | 1 | 0 |
| 1 | 0 | 1 |
| 1 | 1 | 0 |

|  | t0 | t1 | t2 | t3 | t4 | t5 | t6 | t7 | t8 | t9 | t10 |
|---|---|---|---|---|---|---|---|---|---|---|---|
| PUSH | 0 | 1 | 1 | 1 | 1 | 1 | 0 | 0 | 0 | 0 | 0 |
| POP | 0 | 0 | 0 | 1 | 0 | 0 | 1 | 1 | 1 | 1 | 0 |
| READY | 1 | 1 | 1 | 1 | 1 | 1 | 0 | 1 | 1 | 1 | 1 |
| VALID | 0 | 0 | 1 | 1 | 1 | 1 | 1 | 1 | 1 | 1 | 0 |
| DIN | — | A | B | C | D | E | — | — | — | — | — |
| DOUT | — | — | A | A | B | B | B | C | D | E | — |
| THE NUMBER OF HELD DATA | 0 | 0 | 1 | 2 | 2 | 3 | 4 | 3 | 2 | 1 | 0 |

FIG.14

| RRESP [1:0]<br>BRESP [1:0] | RESPONSE | MEANING |
|---|---|---|
| b00 | OKAY | NORMAL ACCESS COMPLETION |
| b01 | EXOKAY | EXCLUSIVE ACCESS COMPLETION |
| b10 | SLVERR | SLAVE ERROR |
| b11 | DECERR | DECODE ERROR |

BUS SYSTEM AND BRIDGE CIRCUIT CONNECTING BUS SYSTEM AND CONNECTION APPARATUS

BACKGROUND

The present disclosure relates to a bus system and specifically relates to a bridge circuit through which the bus system and connection apparatuses are connected to each other.

In a bus system, plural connection apparatuses are connected to a bus (referred to as "an interconnect" as well), and data transfer is carried out among the plural connection apparatuses. A connection apparatus which plays a leading role in the data transfer is called a master, and a connection apparatus which is passively operated is called a slave. A processor, for example, is supposed as the connection apparatus becoming the master. A memory, for example, is supposed as the connection apparatus becoming the slave.

In such a bus system, of a series of operations (transaction) for the data transfer, a request for the data transfer, and the actual data transfer are controlled independently of each other (split transaction), thereby making it possible to enhance a transfer efficiency. On the other hand, in the case where the split transaction is permitted, when a certain master or slave is hanged up due to some sort of failure, the hang-up of the entire system is reached in some cases. For example, it is supposed that in the interconnect through which masters M0 and M1, and slaves S0 and S1 are connected to each other, the slave S0 is hanged up while the master M1 accesses both of the slaves S0 and S1. When there is an order regulation in which data from the slave S0 is returned back to the master M0 earlier than data from the slave S1, it may be impossible to complete the transfer as well between the master M0 and the slave S1. At this time, since it may be impossible to complete the transfer in the slave S1 itself, when the master M1 accesses the slave S1, it may be impossible to complete this access as well. As a result, the slave S0 is hanged up, which results in that other masters M0 and M1, and slave S1 are all hanged up.

In this regard, in a system in which the split transaction is not permitted, if either the master or the slave causing the hang-up is electrically disconnected from the interconnect when only one access is simultaneously carried out, a system operation can be continued. For example, a bus system is proposed in which a bus disconnection signal is outputted to a gate, thereby electrically disconnecting a bus master. This system, for example, is disclosed in Japanese Patent Laid-Open No. 2002-269033 (refer to FIG. 1).

SUMMARY

However, in a system in which outstanding execution for plural pieces of transfer is possible, it may be caused that at a time point when the hang-up is caused, plural accesses are middle in execution. Therefore, there is the possibility that just electrically disconnecting the connection apparatus causes malfunctions of other connection apparatuses, and thus it becomes difficult to continue the system operation.

The present disclosure has been made in order to solve the problems described above, and it is therefore desirable to provide a bus system from which a connection apparatus in execution of split transaction can be disconnected without causing a malfunction, and a bridge circuit through which the bus system and connection apparatuses are connected to each other.

In order to attain the desire described above, according to an embodiment of the present disclosure, there is provided a bus system including: a first connection apparatus and a second connection apparatus carrying out an exchange in accordance with a predetermined protocol; a bus through which the first and second connection apparatuses are connected to each other; and a bridge inserted between the first connection apparatus and the bus, and carrying out an exchange with the second connection apparatus in accordance with the predetermined protocol instead of the first connection apparatus when receiving a disconnection instruction for the first connection apparatus.

As a result, even when the first connection apparatus is disconnected from the bus system, it is possible to secure the coherency with the second connection apparatus based on the predetermined protocol.

Preferably, the first connection apparatus is a connection apparatus playing a leading role in transfer with the second connection apparatus, and the second connection apparatus is a connection apparatus passively operated for transfer with the first connection apparatus.

That is to say, it is supposed that the first connection apparatus functions as a master, and the second connection apparatus functions as a slave. In this case, preferably, when the bridge receives the disconnection instruction for the first connection apparatus, the bridge may stop issue of a read address from the first connection apparatus, and may permit reception of read data from the second connection apparatus.

In addition, preferably, when the bridge receives the disconnection instruction for the first connection apparatus, the bridge may stop issue of a write address from the first connection apparatus, and may permit reception of a write response from the second connection apparatus.

At this time, preferably, even in a case where the bridge stops the issue of the write address from the first connection apparatus when the bridge receives the disconnection instruction for the first connection apparatus, the bridge may issue write data being burst-transferred until end of the burst transfer.

In addition, preferably, the second connection apparatus may be a connection apparatus playing a leading role in transfer with the first connection apparatus, and the first connection apparatus may be a connection apparatus passively operated for transfer with the second connection apparatus.

That is to say, it is supposed that the second connection apparatus functions as a master, and the first connection apparatus functions as a slave. In this case, preferably, when the bridge receives the disconnection instruction for the first connection apparatus, the bridge may permit reception of a read address from the second connection apparatus, and may send a fixed value representing error information back to the second connection apparatus.

In addition, preferably, when the bridge receives the disconnection instruction for the first connection apparatus, the bridge may permit reception of a write address from the second connection apparatus, and may send a fixed value representing error information back to the second connection apparatus.

In addition, preferably, when the bridge receives the disconnection instruction for the first connection apparatus, the bridge may clamp a signal from the first connection apparatus at a predetermined level. As a result, when the first connection apparatus is disconnected from the bus system, it is possible to stabilize the signal.

According to another embodiment of the present disclosure, there is provided a bridge circuit for use in a bus system including a first connection apparatus and a second connection apparatus carrying out an exchange in accordance with a predetermined protocol, and a bus through which the first and second connection apparatuses are connected to each other, in which the bridge circuit is inserted between the first connection apparatus and the bus, and carries out an exchange with the second connection apparatus in accordance with the predetermined protocol instead of the first connection apparatus when receiving a disconnection instruction for the first connection apparatus.

As a result, even when the first connection apparatus is disconnected from the bus system, it is possible to secure the coherency with the second connection apparatus based on the predetermined protocol.

As set forth hereinabove, according to an embodiment of the present disclosure, it is possible to offer an excellent effect that in the bus system, the connection apparatus in execution of the split transaction can be disconnected from the bus system without causing the malfunction.

BRIEF DESCRIPTION OF THE DRAWINGS

FIG. 3 is a diagram showing signals composing a read address channel in an AXI (Advanced eXtensible Interface) protocol;

FIG. 4 is a diagram showing signals composing a read data channel in the AXI protocol;

FIG. 5 is a diagram showing signals composing a write address channel in the AXI protocol;

FIG. 6 is a diagram showing signals composing a write data channel in the AXI protocol;

FIG. 7 is a diagram showing signals composing a write response channel in the AXI protocol;

FIG. 9 is a diagram showing a truth table about an operation of a reset priority SR flip flop in the bus system according to the first embodiment of the present disclosure;

FIG. 14 is a diagram showing meanings of a read response PRESP signal and a write response BRESP signal in the AXI protocol;

DETAILED DESCRIPTION OF THE PREFERRED EMBODIMENTS

Embodiments of the present disclosure will be described in detail hereinafter with reference to the accompanying drawings. It is noted that the description will be given below in accordance with the following order:

1. First Embodiment (case where signal clamping in phase of disconnection is not supposed); and 2. Second Embodiment (case where signal clamping in phase of disconnection is supposed).

1. First Embodiment

Entire Configuration of Bus System

Figure 1:
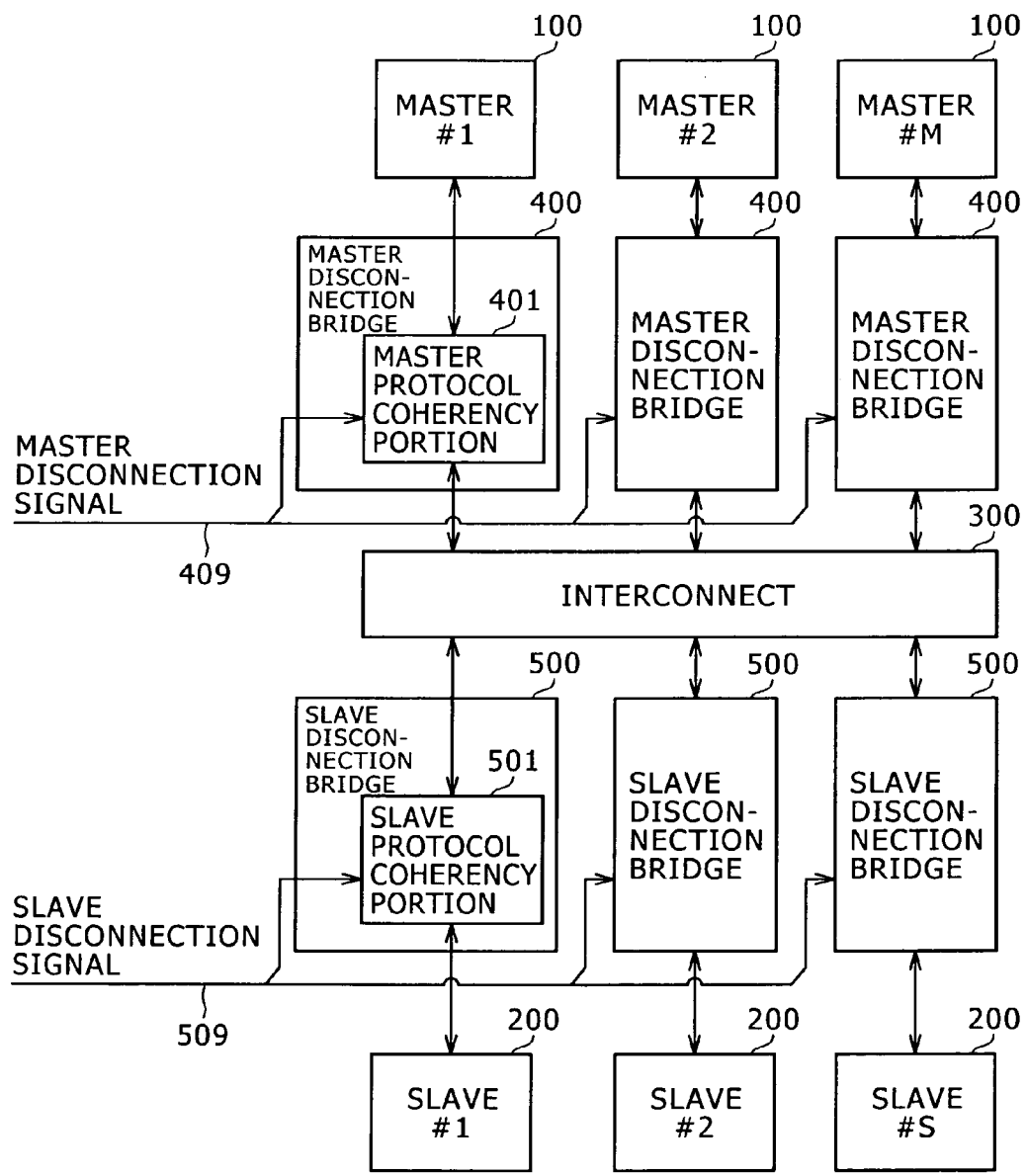
FIG. 1 is a block diagram showing an entire configuration of a bus system according to a first embodiment of the present disclosure.

FIG. 1 is a block diagram showing an entire configuration of a bus system according to a first embodiment of the present disclosure. In the bus system, plural connection apparatuses are connected to an interconnect 300 functioning as a bus. The plural connection apparatuses are classified into M masters 100 and S slaves 200. The master 100 is a connection apparatus which plays a leading role in data transfer. Also, the slave 200 is an apparatus which is passively operated. It is noted that M and S are integral numbers each of which is equal to or larger than 1.

In the first embodiment of the present disclosure, master disconnection bridges 400 are connected between the interconnect 300 and the masters 100, correspondingly. Also, slave disconnection bridges 500 are connected between the interconnect 300 and the slaves 200, correspondingly. Each of the master disconnection bridges 400 includes a master protocol coherency portion 401. The master protocol coherency portion 401 secures the coherency on the bus protocol when the master 100 connected thereto is disconnected from the bus system. Each of the slave disconnection bridges 500 includes a slave protocol coherency portion 501. The slave protocol coherency portion 501 secures the coherency on the bus protocol when the slave 200 connected thereto is disconnected from the bus system.

Master disconnection signals 409 independent of one another are inputted to the master disconnection bridges 400, correspondingly. Also, the master 100 corresponding to one of the master disconnection signals 409, respectively, is disconnected from the bus system. That is to say, the master disconnection signals 409 are composed of M signals. Likewise, slave disconnection signals 509 independent of one another are inputted to the slave disconnection bridges 500, correspondingly. Also, the slave 200 corresponding to one of the slave disconnection signals 509, correspondingly, is disconnected from the bus system. That is to say, the slave disconnection signals 509 are composed of S signals. A disconnection instruction based on the master disconnection signal 409 and the slave disconnection signal 509 either may be triggered by detection of hang-up in the interconnect 300 or may be triggered by a manipulation input from a user. Transition timings of the master disconnection signal 409 and the slave disconnection signal 509 may be arbitrary timings, and thus there is no need for taking synchronization with other signals into consideration.

It is noted that the master 100 is an example of a first or second connection apparatus of the present disclosure. In addition, the slave 200 is an example of the second or first connection apparatus of the present disclosure. In addition, the interconnect 300 is an example of a bus of the present disclosure. Also, each of the master disconnection bridge 400 and the slave disconnection bridge 500 is an example of a bridge of the present disclosure.

[Configuration of Master Protocol Coherency Portion]

Figure 2:
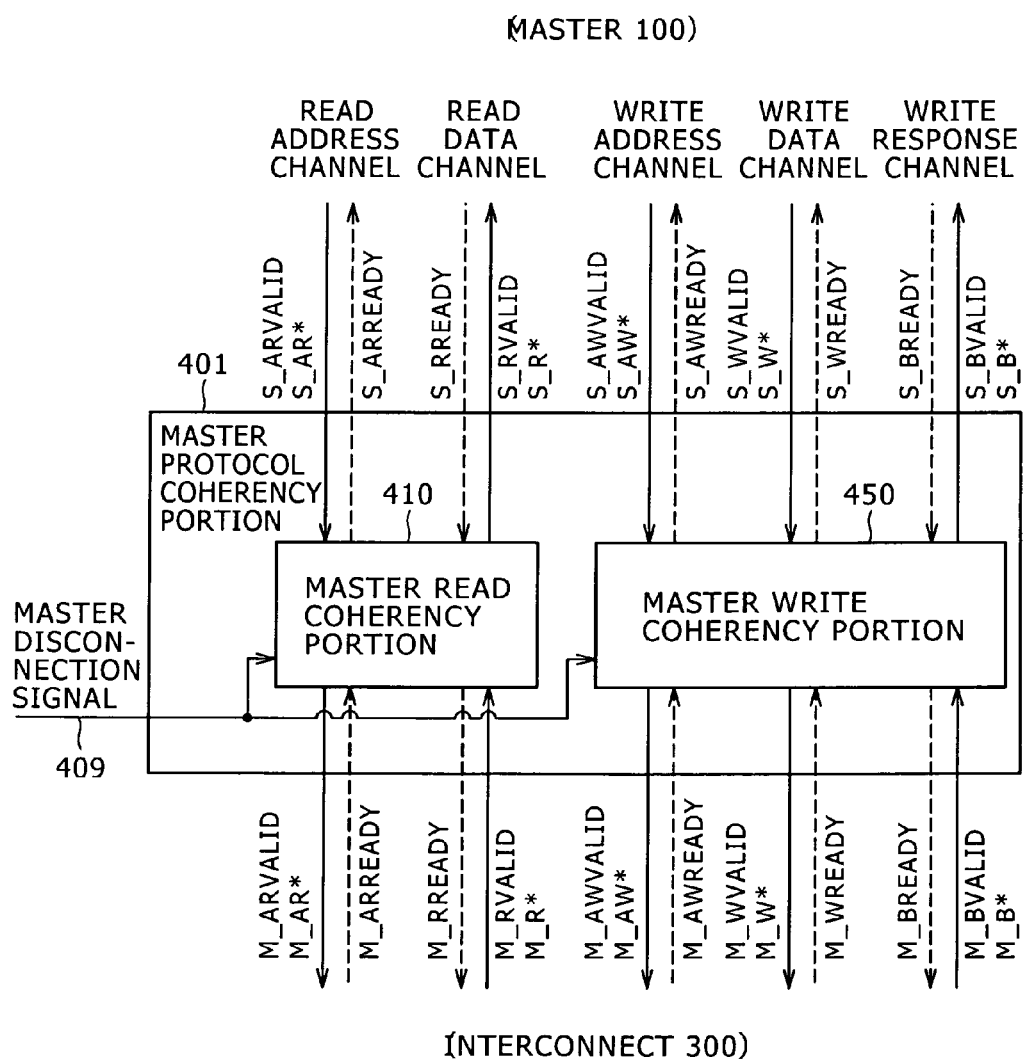
FIG. 2 is a block diagram showing a configuration of a master protocol coherency portion in the bus system according to the first embodiment of the present disclosure.

FIG. 2 is a block diagram showing a configuration of the master protocol coherency portion 401 in the first embodiment of the present disclosure. The master protocol coherency portion 401 includes a master read coherency portion 410 and a master write coherency portion 450. A common master disconnection signal 409 is inputted to each of the master read coherency portion 410 and the master write coherency portion 450.

The master read coherency portion 410 serves to secure the coherency on the protocol when during a read operation by corresponding master 100, the corresponding master 100 is disconnected from the bus system. In this case, an Advanced eXtensible Interface (AXI) protocol is supposed as a typical example of the (split transaction) bus through which a request for the data transfer and actual data transfer are controlled independently of each other. In the AXI protocol, a read address channel and a read data channel are prepared as a path for a read operation. When a request containing therein a read address is transferred from the master 100 to the slave 200 through the read address channel, in response to the request, read data is transferred from the slave 200 to the master 100 through the read data channel.

The master write coherency portion 450 serves to secure the coherency on the protocol when during a write operation by corresponding master 100, the corresponding master 100 is disconnected from the bus system. In the AXI protocol, a write address channel, a write data channel, and a write response channel are prepared as a path for a write operation. When a write request is transferred from the master 100 to the slave 200 through both of the write address channel and the write data channel, in response to the write request, a write operation is carried out in the slave 200. Also, a result of the write operation is transferred from the slave 200 to the master 100 through the write response channel.

In the AXI protocol, transmission of information (for example, data transfer) is carried out when both of a valid signal VALD and a ready signal READY are asserted in the respective channels. For example, in the case of the read address channel, the master 100 as the transmission source sets the read address or the like, and asserts a valid signal ARVALID to "1." At this time, the slave 200 as the receiving side asserts a ready signal ARREADY to "1" at a timing becoming receivable. As a result, while both of the valid signal ARVALID and the ready signal AREADY are set to "1," the read address and the like are transmitted.

Although details of the channel will be described later, with regard to the signal names of the channels, "S_" is added as a prefix to the signal connected from the master 100 side to the slave 200 side. Also, "M_" is added as a prefix to the signal connected from the slave 200 side to the master 100 side. In addition, "AR," "R," "AW," "W," and "B" are added to the read address channel, the read data channel, the write address channel, the write data channel, and the write response channel so as to follow the prefixes, respectively. In addition, in FIG. 2, signals other than the valid signal VALID and the ready signal READY are collectively meant by a mark "*."

Also, a solid line arrow indicates a direction of the valid and the sending information, and a dotted line arrow indicates a direction of the ready signal.

[Channel Composition in AXI Protocol]

FIG. 3 is a diagram showing signals composing the read address channel in the AXI protocol. The read address channel is a channel through which the read address is transmitted from the master 100 to the slave 200. The read address channel is composed of signals of a read address identifier, a read address, a burst length, a burst size, a burst type, a lock type, a cache type, protection type, read address valid, and read address ready. Of these signals, only the read address ready is the signal sent from the slave 200, and the signals other than the read address ready are the signals sent from the master 100.

The read address identifier ARID [3:0] is a 4-bit tag for identifying a read address group of the signals. In the AXI protocol, in the case where the slave is requested to maintain an order relationship when the master issues the transaction, the same identifier is added. In other words, there is no guarantee of maintaining the order relationship among the transactions having the different identifiers.

The read address ARADDR [31:0] is a 32-bit address becoming a read object, and is a signal representing an initial address in the burst transfer.

The burst length ARLEN [3:0] is a 4-bit signal representing the number of data in the burst transfer. The number of data of any one of "1" to "16" is encoded into 4 bits to be shown.

The burst size ARSIZE [2:0] is a 3-bit signal representing the transfer size in each of times in the burst transfer. The transfer size of any one of "$2^0$," "$2^1$," "$2^2$," "$2^3$," "$2^4$," "$2^5$," "$2^6$," and "$2^7$" is encoded into 3 bits to be shown.

The burst type ARBURST [1:0] is a 2-bit signal representing a type of an address calculation for the burst transfer. Specifically, any type of a FIFO type, a continuous access, a cache line can be specified.

The lock type ARLOCK [1:0] is a 2-bit signal representing information for an atomic access. Specifically, any type of a normal access, an exclusive access, and an access with lock can be specified.

The cache type ARCACHE [3:0] is a 4-bit signal representing information necessary for control for a cache memory. Specifically, there is shown control information as to whether or not cache is possible, write through or write back, and so forth.

The protection type ARPROT [2:0] is a 3-bit signal representing information necessary for protection control. Specifically, protection levels of a privilege access, a non-secure access, and an instruction access can be specified.

The read address valid ARVALID is a valid signal representing validity of the address and the control signal. The read address ready ARREADY is a ready signal representing whether or not the slave 200 is in a state of being capable of receiving the address and the control signal. As described above, when both of the read address valid ARVALID and the read address ready ARREADY are asserted, the address and the control signal are transferred.

FIG. 4 is a diagram showing signals composing the read data channel in the AXI protocol. The read data channel is a channel through which the read data is transferred from the slave 200 to the master 100. The read data channel is composed of signals of a read identifier tag, read data, a read response, read last, read valid, and read ready. Of these signals, only the read ready is the signal sent from the master 100, and the signals other than the read ready are the signals sent from the slave 200.

The read identifier tag RID [3:0] is a 4-bit tag for identifying a read data group of the signals. The read identifier tag RID [3:0] is generated in the slave, and thus needs to agree with the read address identifier ARID [3:0].

The read data RDATA [31:0] is read data sent from the slave 200 based on the read transaction. Although in this case, the read data bus having a 32-bit width is supposed, a bit width of the read data RDATA is changed depending on the read data bus width. The read data bus has a bit width of any one of 8, 16, 32, 64, 128, 256, 512, and 1024.

The read response RRESP [1:0] is a 2-bit signal representing a state of the data transfer based on the read transaction. Details of the signal contents will be described later.

The read last RLAST is a signal representing the effect that the data transfer concerned is final data transfer in the read transaction.

The read valid RVALID is a valid signal representing the validity of the read data requested. The read ready PREADY is a ready signal representing whether or not the master 100 is in a state of being capable of receiving the read data. As described above, when both of the read valid RVALID and the read ready RREADY are asserted, the read data is transferred.

FIG. 5 is a diagram showing signals composing a write address channel in the AXI protocol. The write address channel is a channel through which the write address is transmitted from the master 100 to the slave 200. The write address channel is composed of signals of a write address identifier, a write address, a burst length, a burst size, a burst type, a lock type, a cache type, a protection type, write address valid, and write address ready. Of these signals, only the write address ready is the signal sent from the slave 200, and the signals other than the write address ready are the signals sent from the master 100.

The write address identifier AWID [3:0] is a 4-bit tag for identifying a write address group of the signals. The write address AWADDR [31:0] is a 32-bit address becoming an object of the write. Also, the write address AWADDR [31:0] is a signal representing an initial address in the burst transfer.

The burst length AWLEN [3:0] is a 4-bit signal representing the number of data for the burst transfer. The burst size AWSIZE [2:0] is a 3-bit signal representing a transfer size in each of times for the burst transfer. The burst type AWBURST [1:0] is a 2-bit signal representing a type of an address calculation for the burst transfer. The lock type AWLOCK [1:0] is a 2-bit signal representing information for an atomic access. The cache type AWCACHE [3:0] is a 4-bit signal representing information necessary for control for the cache memory. Also, the protection type AWPROT [2:0] is a 3-bit signal representing information necessary for protection control. These signals are basically identical to those in the case of the read address channel.

The write address valid AWVALID is a valid signal representing the validity of the address and the control signal. The write address ready AWREADY is a ready signal representing whether or not the slave 200 is in a state of being capable of receiving the address and the control signal. As described above, when both of the write address valid AWVALID and the write address ready AWREADY are asserted, the address and the control signal are both transferred.

FIG. 6 is a diagram showing signals composing a write data channel in the AXI protocol. The write data channel is a channel through which the write data is transferred from the master 100 to the slave 200. The write data channel is composed of signals of a write identifier tag, write data, write strobe, last write, write valid, and write ready. Of these signals, only the write ready is the signal sent from the slave 200. The signals other than the write ready are the signals sent from the master 100.

The write identifier tag WID [3:0] is a 4-bit tag for identifying a write data group of the signals. The write identifier tag WID [3:0] needs to agree with the write address identifier AWID [3:0].

The write data WDATA [31:0] is write data to the slave 200 based on the write transaction. Although in this case, a write data bus having a 32-bit width is supposed, the bit width of the write data WDATA is changed depending on the read data bus width. The write data bus has the bit width of any one of 8, 16, 32, 64, 128, 256, 512, and 1,024.

The write strobe WSTRB [3:0] is a 4-bit signal representing a position of a byte which is to be updated in a memory of the slave 200. 1 bit of the write strobe WSTRB [3:0] is allocated every 8 bits of the write data bus. That is to say, the write strobe WSTRB [i] corresponds to the WDATA [(8×i)+7:(8×i)].

The write last WLAST is a signal representing the effect that the data transfer concerned is the final data transfer in the write transaction.

The write valid WVALID is a valid signal representing the validity of the write data. The write ready WREADY is a ready signal representing whether or not the slave 200 is in a state of being capable of receiving the write data. As described above, when both of the write valid WVALD and the write ready WREADY are asserted, the write data is transferred.

FIG. 7 is a diagram showing signals composing a write response channel in the AXI protocol. The write response channel is a channel through which a result of the write transaction is transmitted from the slave 200 to the master 100. The write response channel is composed of signals of a response identifier, a write response, write response valid, and response ready. Of these signals, only the response ready is the signal sent from the master 100, and the signals other than the response ready are the signals sent from the slave 200.

The response identifier BID [3:0] is a 4-bit tag for identifying a write response. The response identifier BID [3:0] needs to agree with the write address identifier AWID [3:0].

The write response BRESP [1:0] is a 2-bit signal representing a state of the data transfer based on the write transaction. Details of signal contents will be described later.

The write response valid BVALID is a valid signal representing the validity of the write response. The response ready BREADY is a ready signal representing whether or not the master 100 is in a state of being capable of receiving the write response. As described above, when both of the write response valid BVALID and the response ready BREADY are asserted, the write response is transmitted.

[Configuration of Master Read Coherency Portion]

Figure 8:
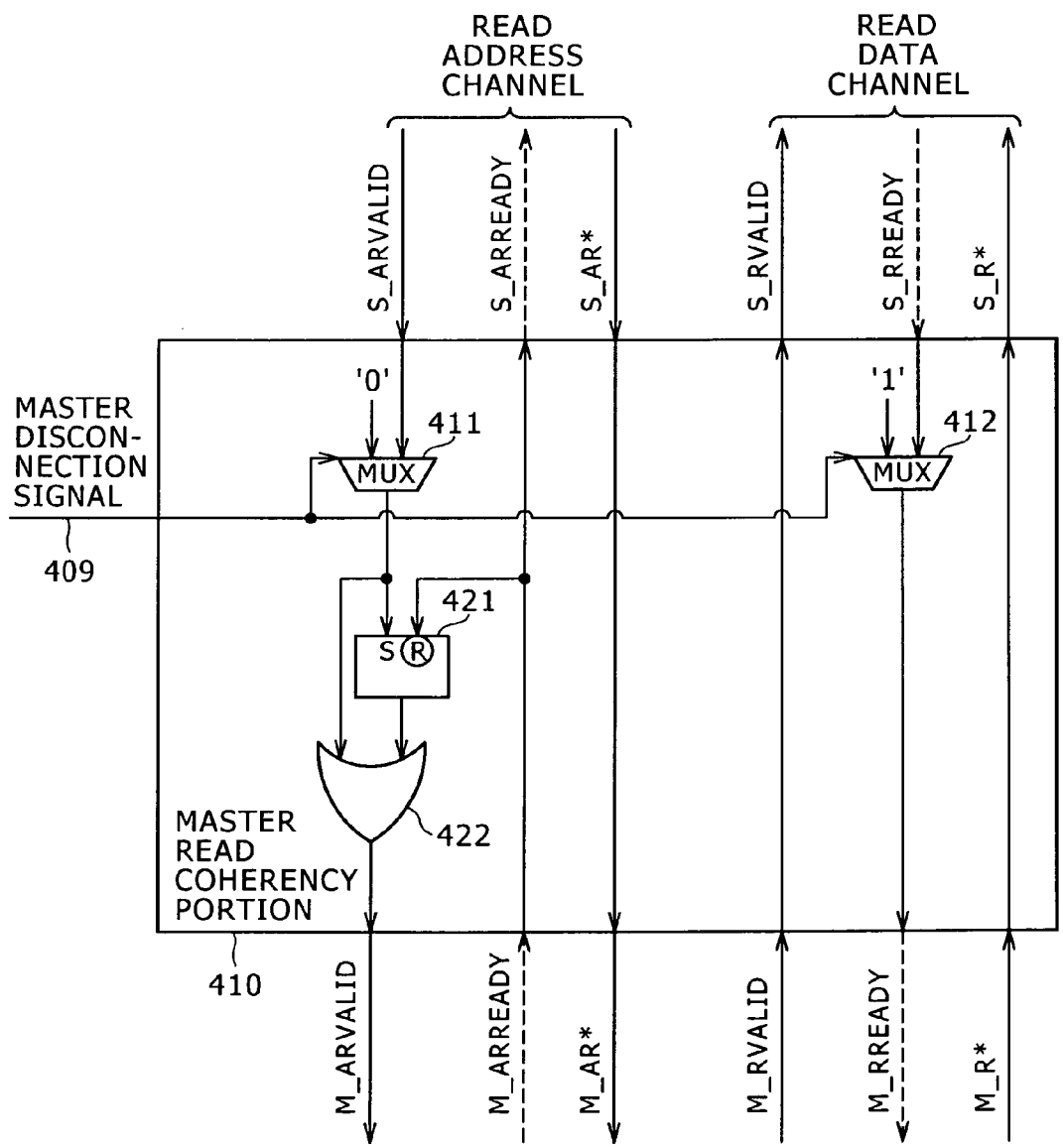
FIG. 8 is a circuit diagram showing a master read coherency portion in the bus system according to the first embodiment of the present disclosure.

FIG. 8 is a circuit diagram showing a configuration of the master read coherency portion 410 in the first embodiment of the present disclosure. The master read coherency portion 410 includes multiplexers 411 and 412, a reset priority SR flip flop 421, and an OR gate 422.

Each of the multiplexers 411 and 412 selects any one of input signals in accordance with the master disconnection signal 409 and outputs the input signal thus selected. The multiplexer 411 outputs a read address valid S_ARVALID signal when the master disconnection signal 409 represents non-disconnection (for example, "0"), and output a constant value "0" when the master disconnection signal 409 represents disconnection (for example, "1"). The output signal, that is, the read address valid S_ARVALID signal or the constant value "0" from the multiplexer 411 is inputted to each of an S input terminal of the reset priority SR flip flop 421, and one of two input terminals of the OR gate 422. The multiplexer 412 outputs a read ready S_RREADY signal when the master disconnection signal 409 represents the non-disconnection, and outputs a constant value "1" when the master disconnection signal 409 represents the disconnection. The output signal, that is, the read ready S_RREADY signal or the constant value "1" from the multiplexer 412 is outputted as a read ready M_RREADY signal.

The reset priority SR flip flop 421 is a flip flop which is set in a next cycle when a set input S is asserted, and is reset in the next cycle when a reset input R is asserted. When the set input S and the reset input R are asserted at the same time, the reset input R is asserted in priority to the set input S, and is then reset in the next cycle. When none of the set input S and the reset input R is asserted, an output signal Q[t] in the next cycle represents an output signal Q[t−1] right before the output signal Q[t] as it is. FIG. 9 is a diagram showing a truth table about the operation of the reset priority SR flip flop 421 in the first embodiment of the present disclosure. An output signal from the reset priority SR flip flop 421 is inputted to one of the two input terminals of the OR gate 422.

The OR gate 422 is a logical gate which carries out a logical sum (OR) arithmetic operation for the output signal from the multiplexer 411, and the output signal from the reset priority SR flip flop 421. An output signal from the OR gate 422 is outputted as a read address valid M_ARVALID signal.

[Operation of Master Read Coherency Portion]

In the read address channel, the read address valid S_ARVALID signal becomes an object of switching made by the multiplexer 411. However, the read address channel is transparent for other signals other than the read address valid S_ARVALID signal, and thus other signals pass through the read address channel as they are. It is noted that in the FIG. 8, the signals other than the read address valid ARVALID signal and the read address ready ARREADY signal are collectively represented by AR*.

In the read data channel, the read ready S_RREADY signal becomes an object of the switching made by the multiplexer 412. However, the read data channel is transparent for other signals other than the read ready S_RREADY signal, and thus other signals pass through the read data channel as they are. It is noted that in the FIG. 8, the signals other than the read valid RVALID signal and the read ready RREADY signal are collectively represented by R*.

When the master disconnection signal 409 represents the disconnection, the multiplexers 411 and 412 output "0" and "1" as the fixed values, respectively. As a result, the same state as that when the read address valid S_ARVALID signal became "0" is obtained, and the master 100 acts like it usually stops the issue of the read address. However, in terms of the regulation of the AXI protocol, when once the VALID signal is asserted to "1," the VALID signal is inhibited from being returned back to "0" until the READY signal is received to establish the transfer operation. Then, the reset priority SR flip flop 421 is used, thereby dissolving the inconvenience when the master disconnection signal 409 is asserted so as to represent the disconnection in a state in which the read address valid M_ARVALID signal is held at "1" and the read address ready M_ARREADY signal is held at "0." That is to say, in this case, the M_ARVALID signal is held at "1" until the M_ARREADY signal has become "1." As a result, even when the master disconnection signal 409 represents the disconnection, the normal AXI protocol is guaranteed in the read address channel. In addition, in the read data channel, when the master disconnection signal 409 represents the disconnection, the same state as that when the read ready S_PREADY signal became "1" is obtained, and thus the master 100 acts like it can usually receive the read data.

In a word, when the master disconnection signal 409 represents the disconnection, the master read coherency portion 410 stops the issue of the read address to the interconnect 300, receives all of the read data for the read addresses which are previously issued, and abandons all of the read data thus received. At this time, before and after the master disconnection signal 409 is changed so as to show representation from the non-disconnection to the connection, the AXI protocol is taken over with its righteousness being held.

[Configuration of Master Write Coherency Portion]

Figure 10:
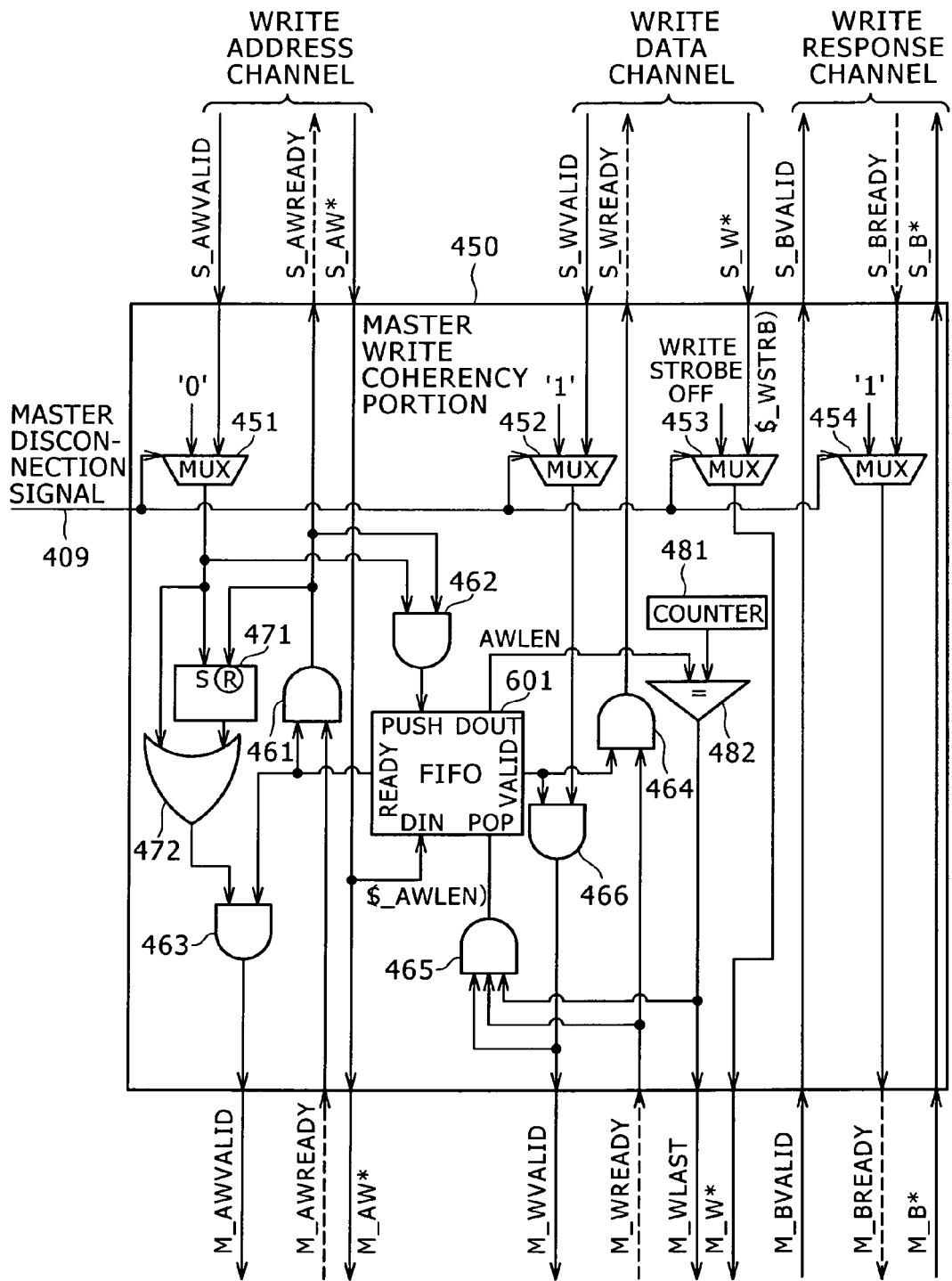
FIG. 10 is a circuit diagram showing a configuration of a master write coherency portion in the bus system according to the first embodiment of the present disclosure.

FIG. 10 is a circuit diagram showing a configuration of the master write coherency portion 450 in the first embodiment of the present disclosure. The master write coherency portion 450 includes multiplexers 451 to 454, a FIFO 601, AND gates 461 to 466, a reset priority SR flip flop 471, an OR gate 472, a counter 481, and a comparator 482.

Each of the multiplexers 451 to 454 serves to select any one of input signals in accordance with the master disconnection signal 409, and outputs the input signal thus selected. The multiplexer 451 outputs a write address valid S_AWVALID signal when the master disconnection signal 409 represents the non-disconnection (for example, "0"), and outputs a constant value "0" when the master disconnection signal 409 represents the disconnection (for example, "1"). The output signal, that is, the write address valid S_AWVALID signal or the constant value "0" from the multiplexer 451 is inputted to each of an S input terminal of the reset priority SR flip flop 471, and one of two input terminals of the OR gate 472.

The multiplexer 452 outputs a write valid S_WVALID signal when the master disconnection signal 409 represents the non-disconnection, and outputs a constant value "1" when the master disconnection signal 409 represents the disconnection. The output signal, that is, the write valid S_WVALID signal or the constant value "1" from the multiplexer 452 is inputted to one of two input terminals of the AND gate 466.

The multiplexer 453 outputs signals S_W* other than the write valid S_WVALID signal and the write ready S_WREADY signal of the write data channel as they are when the master disconnection signal 409 represents the non-disconnection. On the other hand, when the master disconnection signal 409 represents the disconnection, the multiplexer 453 switches OFF all of 4 bits of a write strobe WSTRB [3:0] of the signals S_W*, and outputs the 4-bit signals thus switched OFF. The output signals from the multiplexer 453 are outputted as signals M_W* other than the write address valid M_WVALID signal, the write ready M_WREADY signal, and the write last M_WLAST signal of the write data channel.

The multiplexer 454 outputs a response ready S_BREADY signal when the master disconnection signal 409 represents the non-disconnection, and outputs a constant value "1" when the master disconnection signal 409 represents the disconnection. The output signal from the multiplexer 454 is outputted as a signal M_B* other than the response valid M_BVALID signal and the response ready M_BREADY signal of the write response channel.

The FIFO 601 is a buffer utilizing a First-In First-Out (FIFO) system. Like a FIFO 600 shown in FIG. 11A, terminals of the FIFO 601 are separated into a data input side and a data output side. That is to say, on the data input side, data at a data input terminal DIN is fetched in at a timing at which a signal at a push input terminal PUSH is asserted. A READY signal shows the effect that the validity is maintained until a capacity of the FIFO 600 is filled. On the data output side, data is drawn out from a data output terminal DOUT at a timing at which a signal at an input terminal POP is asserted. The head data continues to be outputted from the data output terminal DOUT in the order of the FIFO until the data is drawn out. The VALID output signal shows the effect that the validity is maintained when at least one piece of data is held within the FIFO 600. The FIFO 601 includes at least one entry, and holds a burst length S_AWLEN signal of the write address channel in each of the entries. The number of entries held in the FIFO 601 is generally determined in consideration of the number of outstanding of the write address channel.

Figures 11A, 11B:
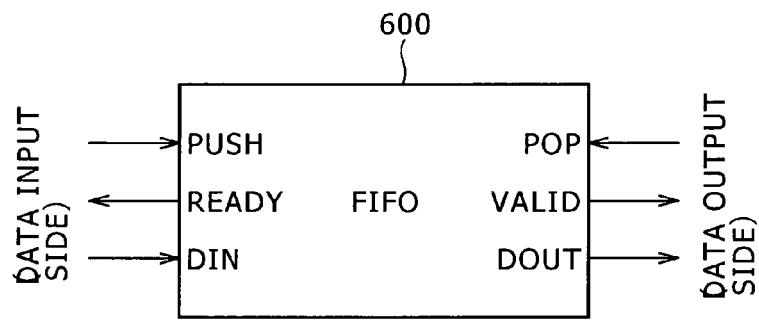
FIGS. 11A and 11B are respectively a block diagram and a diagram showing an operation of a FIFO (First-In First-Out) in the bus system according to the first embodiment of the present disclosure.

In an operation of the FIFO 600 shown in FIG. 11B, at a timing t0, the FIFO 600 is in an empty state, the READY output signal is "1" and the VALID output signal is "0." When data A is pushed to the input terminal DIN at a timing t1, the data A comes to be outputted to the output terminal DOUT at a timing t2. Since the data is not popped at the timing t2, the data A is continuously outputted to the output terminal DOUT at a timing t3 as well. Push at a timing t5 results in that the number of held data becomes four at a timing t6, and the READY output signal becomes "0." Popping at a timing t6 results in that the READY output signal becomes "1" again at a timing t7. Also, popping is continuously carried out, whereby the FIFO 600 becomes empty and thus the VALID output signal becomes "1" at a timing t10.

The reset priority SR flip flop 471 is a flip flop which is set in a next cycle when the set output signal S is asserted, and is reset in the next cycle when the reset input signal R is asserted. The OR gate 472 is a logical gate which carries out a logical sum (OR) arithmetic operation for the output signal from the multiplexer 451, and the output signal from the reset priority SR flip flop 471. The functions of the reset priority SR flip flop 471 and the OR gate 472 are the same as those of the reset priority SR flip flop 421 and the OR gate 422 previously described with reference to FIG. 8.

The counter 481 is a burst transfer frequency counter which is reset to "0" before start of the burst transfer, and is incremented one by one whenever the burst transfer is carried out. The comparator 482 serves to compare the output signal from the counter 481, and the data output signal DOUT from the FIFO 601, that is, the burst length AWLEN with each other. An output signal from the comparator 482 is outputted as a last write M_WLAST. That is to say, a timing of the final data in the burst transfer is detected by the counter 481 and the comparator 482. It is noted that a timing at which the counter 481 is reset either may be set to a phase of start of the burst transfer, or may be set when the final data is detected in the last burst transfer.

The AND gate 461 carries out a logical product (AND) arithmetic operation for the READY output signal from the FIFO 601, and a write address ready M_AWREADY signal of the write address channel. An output signal from the AND gate 461 is outputted as the write address ready S_AWREADY signal of the write address channel. That is to say, the AND gate 461 is controlled in such a way that only when the READY output signal from the FIFO 601 shows the validity, the write address ready S_AWREADY signal represents "a state of being capable of being received."

The AND gate 462 carries out an AND arithmetic operation for the output signal from the multiplier 451, and the write address ready S_AWREADY signal of the write address channel. An output signal from the AND gate 462 is outputted to the input terminal PUSH of the FIFO 601. That is to say, the AND gate 462 is controlled in such a way that when the transfer in the write address channel is established, the burst length S_AWLEN [3:0] of the write address channel is fetched in the FIFO 601.

The AND gate 463 carries out an AND arithmetic operation for the output signal from the OR gate 472, and the READY output signal from the FIFO 601. An output signal from the AND gate 463 is outputted as a write address valid M_AWVALID signal. That is to say, the AND gate 463 is controlled in such a way that only when a free space is left in the FIFO 601, the write address valid M_AWVALID signal becomes valid.

The AND gate 464 carries out an AND arithmetic operation for the VALID output signal from the FIFO 601, and the write ready M_WREADY signal. An output signal from the AND gate 464 is outputted as a write ready S_WREADY signal. That is to say, the AND gate 464 is controlled in such a way that only when the valid data is held in the FIFO 601, the write ready S_WREADY signal is asserted.

The AND gate 465 carries out an AND arithmetic operation for the output signal from the AND gate 466, the output signal from the comparator 482, and the write ready M_WREADY signal. An output signal from the AND gate 465 is outputted to the input terminal POP of the FIFO 601. That is to say, the AND gate 465 is controlled in such a way that when the final data (final beat) in the burst transfer is transferred, the head data (the burst length AWLEN [3:0]) held in the FIFO 601 is drawn out.

The AND gate 466 carries out an AND arithmetic operation for the output signal from the multiplier 452, and the VALID output signal from the FIFO 601. An output signal from the AND gate 466 is outputted as a write valid M_WVALID signal. That is to say, the AND gate 466 is controlled in such a way that only when the valid data is held in the FIFO 601, the write valid M_WVALID signal is asserted.

A description will now be given with respect to the case where the writer disconnection signal represents the non-disconnection. The write address channel is transparent for the signals AW* other than the write address valid AWVALID signal and the write address ready AWREADY signal, and thus the signals AW* pass through the write address channel as they are. When the transfer is established, that is, when both of the write address valid AWVALID signal and the write address ready AWREADY signal are asserted, the burst length S_AWLEN is fetched in the FIFO 601. When the free space becomes absent in the FIFO 601, both of the write address valid AWVALID signal and the write address ready AWREADY signal are de-asserted to "0," and thus the establishment of the write address channel transfer is inhibited until the free space comes present in the FIFO 601.

The write data channel is also transparent for the signals W* other than the write valid WVALID signal and the write ready WREADY signal, and thus the signals W* pass through the write data channel as they are. When the transfer of the final data in the burst transfer for the signals W* is established, that is, when all of the write valid WVALID signal, the write ready WREADY signal, and the write last WLAST signal are asserted, the burst length AWLEN held in the head of the FIFO 601 is drawn out. When the FIFO 601 is empty, both of the write valid M_WVALID and the write ready S_WREADY are de-asserted, and the establishment of the transfer of the write data channel is inhibited until the valid entry is inputted.

When the master disconnection signal represents the disconnection, each of the multiplexers 451 to 454 selects the fixed value side. The write address channel becomes the same state as that when the write address valid S_AWVALID signal becomes "0" by the multiplexer 451. Thus, the master 100 acts like it usually stops the issue of the write address. However, in terms of the regulation of the AXI protocol, when once the VALID signal is asserted to "1," the VALID signal is inhibited from being returned back to "0" until the READY signal is received to establish the transfer. Then, similarly to the case of the master read coherency portion 410, both of the reset priority SR flip flop 471 and the OR gate 472 are used, thereby dissolving the inconvenience. That is to say, in this case, the write address valid M_AWVALID signal is held at "1" until the write address ready M_AWREADY signal becomes "1." As a result, even when the master disconnection signal 409 represents the disconnection, the normal AXI protocol is guaranteed in the write address channel.

In addition, with regard to the write data channel, the write valid S_WVALID signal is fixed to "1" by the multiplexer 452, and the strobe signal of the write data channel is fixed to "0" by the multiplexer 453. As a result, the master 100 acts like it usually issues the write transaction in the state of holding the write strobe at OFF irrespective of the state of the master 100.

In addition, with regard to the write response channel, the response ready S_BREADY signal is fixed to "1" by the multiplier 454. As a result, the master 100 acts like it can usually receive the write response irrespective of the state of the master 100.

In a word, when the master disconnection signal 409 represents the disconnection, the master write coherency portion 450 stops the issue of the write address to the interconnect 300, and issues the write data corresponding to the write address which is previously issued in a state of holding the write strobe at OFF. Also, the master write coherency portion 450 receives all of the write responses, and abandons all of the write responses thus received. At this time, before and after the master disconnection signal 409 is changed so as to show representation from the non-disconnection to the connection, the AXI protocol is taken over with its righteousness being held.

[Configuration of Slave Protocol Coherency Portion]

Figure 12:
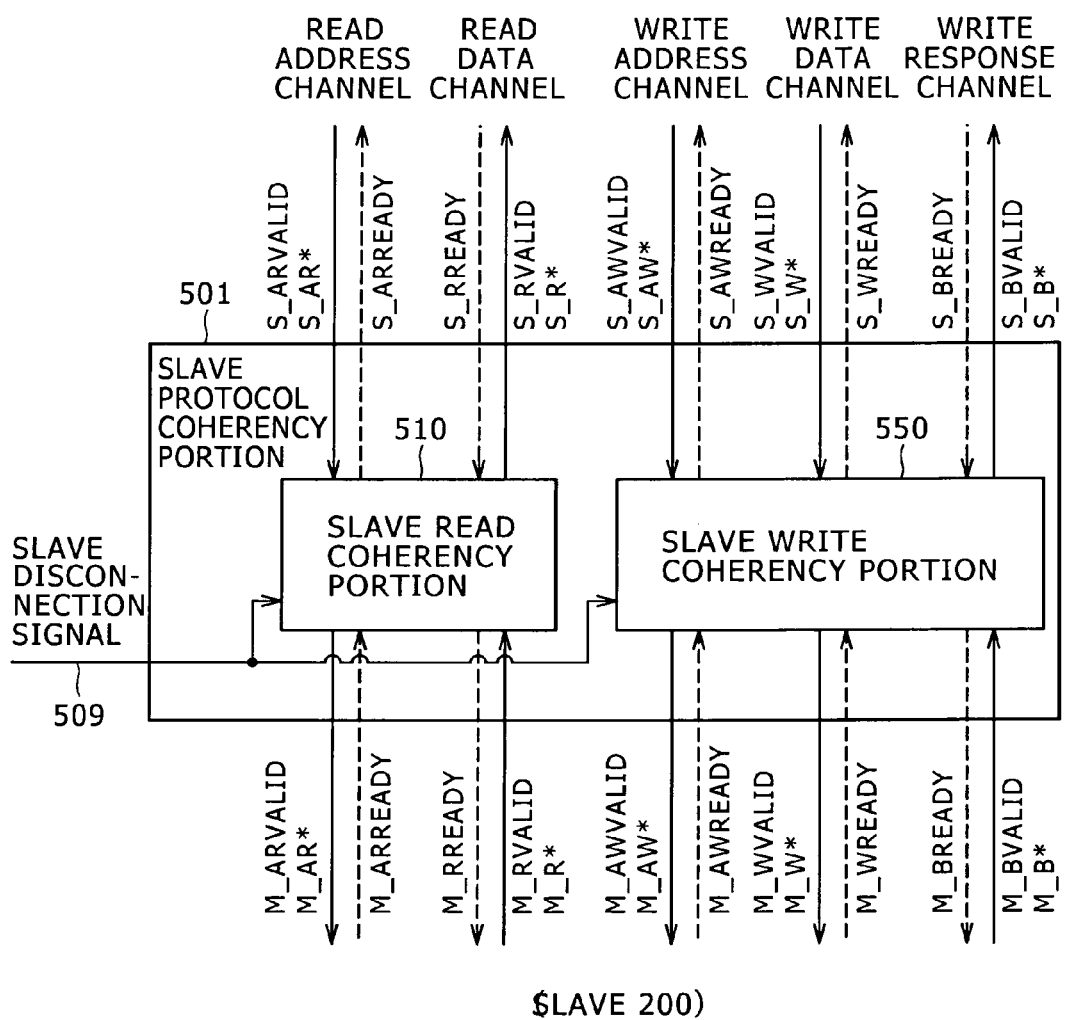
FIG. 12 is a block diagram showing a configuration of a slave protocol coherency portion in the bus system according to the first embodiment of the present disclosure.

FIG. 12 is a block diagram showing a configuration of the slave protocol coherency portion 501 in the first embodiment of the present disclosure. The slave protocol coherency portion 501 includes a slave read coherency portion 510 and a slave write coherency portion 550. A common slave disconnection signal 509 is inputted to the slave read coherency portion 510 and the slave write coherency portion 550.

The slave read coherency portion 510 serves to secure the coherency on the protocol when during the read operation by corresponding slave 200, the corresponding slave 200 is disconnected. As described above, in the AXI protocol, a read address channel and a read data channel are prepared as a path for the read operation, and the slave read coherency portion 510 secures the coherency between the read address channel and the read data channel.

The slave write coherency portion 550 serves to secure the coherency on the protocol when during the write operation by corresponding slave 200, the corresponding slave 200 is disconnected. As described above, in the AXI protocol, a write address channel and a write data channel are prepared as a path for the write operation, and the slave write coherency portion 550 secures the coherency between the write address channel and the write data channel.

[Configuration of Slave Read Coherency Portion]

Figure 13:
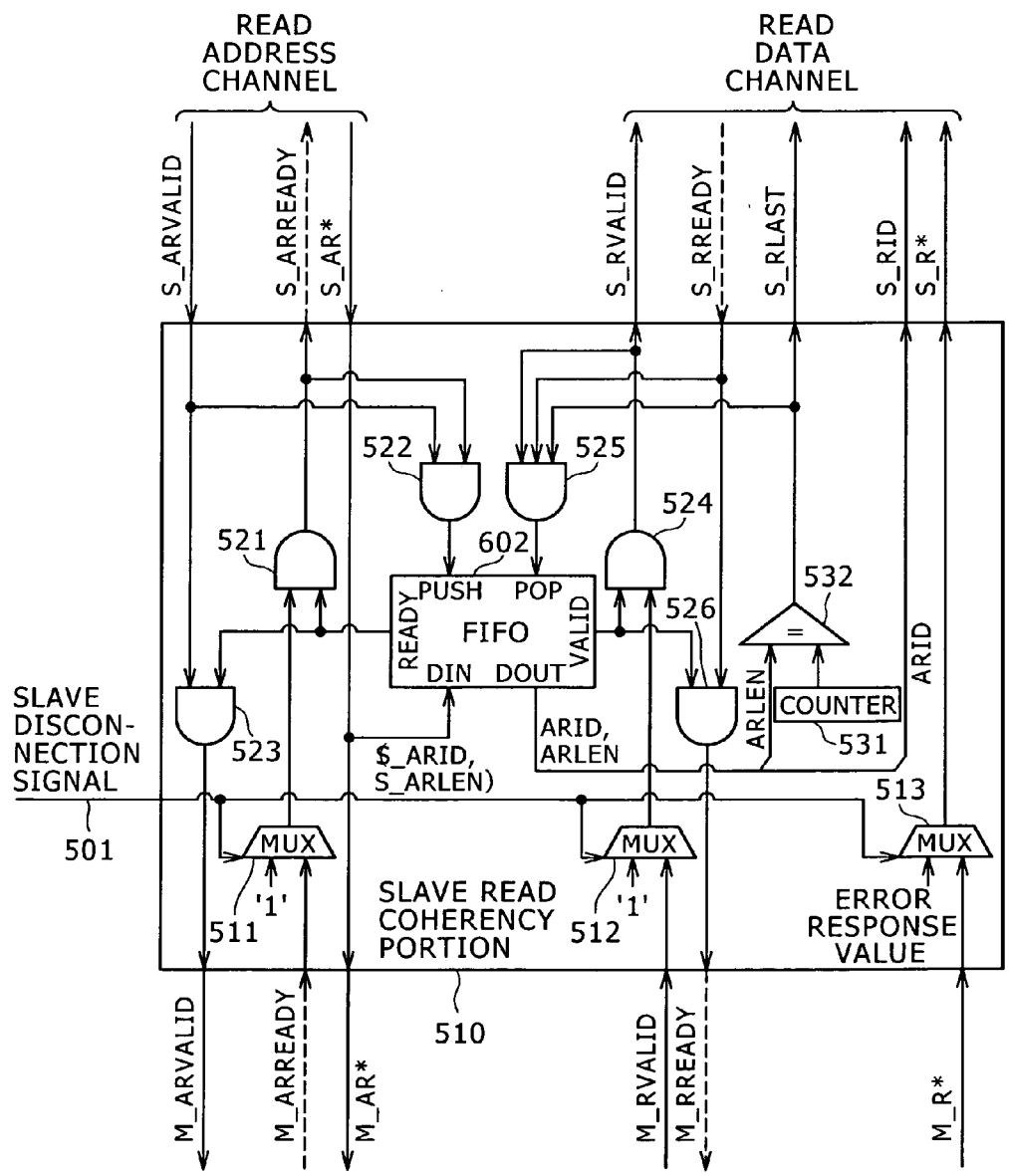
FIG. 13 is a circuit diagram showing a configuration of a slave read coherency portion in the bus system according to the first embodiment of the present disclosure.

FIG. 13 is a circuit diagram showing a configuration of the slave read coherency portion 510 in the first embodiment of the present disclosure. The slave read coherency portion 510 includes multiplexers 511 to 513, AND gates 521 to 526, a FIFO 602, a counter 531, and a comparator 532.

Each of the multiplexers 511 to 513 selects any one of input signals in accordance with the slave disconnection signal 509, and outputs the input signal thus selected. The multiplexer 511 outputs a read address ready M_ARREADY signal when the slave disconnection signal 509 represents the non-disconnection (for example, "0"), and outputs a constant value "1" when the slave disconnection signal 509 represents the disconnection (for example, "1"). The output signal, that is, the read address ready M_ARREAY signal or the constant value "1" from the multiplexer 511 is inputted to one of two input terminals of the AND gate 521.

The multiplexer 512 outputs a read valid M_RVALID signal when the slave disconnection signal 509 represents the non-disconnection, and outputs a constant value "1" when the slave disconnection signal 509 represents the disconnection. The output signal, that is, the read valid M_RVALID signal or the constant value "1" from the multiplexer 512 is inputted to one of two input terminals of the AND gate 524.

The multiplexer 513 outputs signals M_R* other than the read valid M_RVALID signal and the read ready M_RREADY signal of the read data channel as they are when the slave disconnection signal 509 represents the non-disconnection. On the other hand, when the slave disconnection signal 509 represents the disconnection, the multiplexer 513 is set in such a way that it shows an error response with respect to a read response RRESP [1:0] signal of the signals M_R*. FIG. 14 is a diagram showing meanings of the read response RRESP signal and the write response BRESP signal in the AXI protocol. According to the meanings shown in FIG. 14, when the usual access is normally completed, the read response RRESP [1:0] signal represents "00." When an exclusive access is normally completed, the read response RRESP [1:0] signal represents "01." When an error occurs in the slave 200, the read response RRESP [1:0] signal represents "10." In addition, when a decode error such as improperness of the address occurs, the read response RRESP [1:0] signal represents "11." In the first embodiment of the present disclosure, when the slave disconnection signal 509 represents the disconnection, "10" meaning the error response is set as the read response RRESP [1:0] in the multiplexer 513.

The FIFO 602 is a buffer utilizing the FIFO system, similarly to the case of the FIFO 601, the FIFO 602 has the function of the FIFO 600 shown in FIGS. 11A and 11B. The FIFO 602 includes at least one entry, and holds a read address identifier S_ARID signal and a burst length S_ARLEN signal of the read address channel in each of the entries. The burst length ARLEN held in the FIFO 602 is outputted to one of two input terminals of the comparator 532, and the read address identifier ARID is outputted as a read identifier S_RID. The number of entries held in the FIFO 602 is generally determined in consideration of the number of outstanding of the read address channel.

The counter 531 is a burst transfer frequency counter which is reset to "0" before start of the burst transfer, and is incremented one by one whenever the burst transfer is carried out.

The comparator 532 compares the output signal from the counter 531, and the burst length ARLEN of the data output signal DOUT from the FIFO 601 with each other. An output signal from the comparator 532 is outputted as a read last S_RLAST. That is to say, a timing of the final data in the burst transfer is detected by the counter 531 and the comparator 532. It is noted that a timing at which the counter 531 is reset either may be set to a phase of start of the burst transfer, or may be set when the final data is detected in the last burst transfer.

The AND gate 521 carries out a logical product (AND) arithmetic operation for the output signal from the multiplexer 511, and the READY output signal from the FIFO 602. An output signal from the AND gate 521 is outputted as a read address ready S_ARREADY signal. That is to say, the AND gate 521 is controlled in such a way that only when the READY output signal from the FIFO 602 shows the validity, the read address ready S_ARREADY signal represents "a state of being capable of being received."

The AND gate 522 carries out an AND arithmetic operation for a read address valid S_ARVALID signal, and a read address ready S_ARREADY signal. An output signal from the AND gate 522 is inputted to an input terminal PUSH of the FIFO 602. That is to say, the AND gate 522 is controlled in such a way that when both of the read address valid S_ARVALID signal and the read address ready S_ARREADY signal are asserted to transmit the read address, both of the read address identifier S_ARID signal and the burst length S_ARLEN signal of the read address are fetched in the FIFO 602.

The AND gate 523 carries out an AND arithmetic operation for the read address valid S_ARVALID signal, and the READY output signal from the FIFO 602. An output signal from the AND gate 523 is outputted as a read address valid M_ARVALID signal. That is to say, the AND gate 523 is controlled in such a way that only when a free space is left in the FIFO 602, the read address valid M_ARVALID signal is asserted.

The AND gate 524 carries out an AND arithmetic operation for the output signal from the multiplexer 512, and the VALID output signal from the FIFO 602. An output signal from the AND gate 524 is outputted as a read valid S_RVALID signal. That is to say, the AND gate 524 is controlled in such a way that only when the valid data is held in the FIFO 602, the read valid S_RVALID signal is asserted.

The AND gate 525 carries out an AND arithmetic operation for the read valid S_RVALID signal, the read ready S_RREADY signal, and the output signal from the comparator 532. An output signal from the AND gate 525 is outputted to the input terminal POP of the FIFO 602. That is to say, the AND gate 525 is controlled in such a way that when the final data (final beat) in the burst transfer is transferred, the head data (the read address identifier ARID [3:0] and the burst length AWLEN [3:0]) held in the FIFO 602 is drawn out.

The AND gate 526 carries out an AND arithmetic operation for the read ready S_RREADY signal, and the VALID output signal from the FIFO 602. An output signal from the AND gate 526 is outputted as a read ready M_RREADY signal. That is to say, the AND gate 526 is controlled in such a way that only when the valid data is held in the FIFO 602, the read ready M_RREADY signal is asserted.

[Operation of Slave Read Coherency Portion]

A description will now be given with respect to the case where the master disconnection signal represents the non-disconnection. The read address channel is transparent for the signals AR* other than the read address valid ARVALID signal, and the read address ready ARREADY signal. Thus, the signals AR* pass through the read address channel as they are. When the transfer is established, that is, when both of the read address valid ARVALID signal and the read address ready ARREADY signal are asserted, the read address identifier S_ARID and the burst length S_AWLEN are both fetched in the FIFO 602. When the free entry becomes absent in the FIFO 602, the read address ready S_ARREADY signal and the read address valid M_ARVALID signal are both de-asserted to "0" by the AND gates 521 and 523. As a result, the establishment of the transfer in the read address channel is inhibited until the free entry becomes present in the FIFO 602. In addition, in the read address channel, the read address identifier M_ARID is set to the fixed value, or the read address identifier M_ARID itself is deleted. As a result, the read data signals R* for the read address signal AR* become unchangeable in order (in-order).

In the read data channel, both of the read identifier S_RID and the read last S_RLAST are generated within the slave read coherency portion 510. Also, the read data channel is transparent for other signals R*. When the transfer of the final data in the burst transfer is established, that is, when all of the read valid RVALID, the read ready RREADY, and the read last RLAST are asserted, the read address identifier ARID and the burst length ARLEN of the head entry are both drawn out from the FIFO 602. That is to say, the read address identifier S_ARID and the burst length S_ARLEN which were fetched in in the phase of the establishment of the transfer in the read address channel are held in the FIFO 602 until the phase of end of corresponding burst transfer. The head entry is outputted to the output terminal DOUT, the read address identifier ARID becomes a read identifier S_RID, and the burst length ARLEN is used to detect the data burst final data. When the FIFO 602 is empty, both of the read valid S_RVALID and the read ready M_RREADY are de-asserted to "0," and thus the establishment of the transfer in the read data channel is inhibited until the valid entry is fetched in.

When the burst length ARLEN signal outputted from the FIFO 602, and the output signal from the counter 531 agree with each other, the read last S_RLAST signal is asserted to "1." For example, when the burst length ARLEN signal is "0" (the burst length is 1), in the first data in the burst transfer, the read last S_RLAST becomes "1." In addition, when the burst length ARLEN signal is "3" (the burst length is 4), after the transfer of the first three data beats in the burst transfer is established, the value of the counter 531 becomes "3," and the read last S_RLAST becomes "1."

When the master disconnection signal represents the disconnection, each of the multiplexers 511 to 513 selects the fixed value side. The read address channel becomes the same state as that when the read address ready S_ARREADY signal becomes "1" by the multiplexer 511. Thus, the slave 200 acts like it can usually receive the read addresses AR*. In addition, with regard to the read data channel, the read valid M_RVALID signal is fixed to "1" by the multiplexer 512, and the read response RRESP signal of the read data is fixed to "10," with which the read response RRESP represents error information, of the read data, by the multiplexer 513. As a result, the slave 200 acts like it usually sends the read data R* in the form of the fixed value irrespective of the state of the slave 200.

In a word, when the slave disconnection signal 509 represents the disconnection, the slave read coherency portion 510 starts to respond to the read address sending source in place of the actual slave 200. Thus, all of the signals outputted from the slave 200 are disregarded. At this time, before and after the slave disconnection signal 509 is changed so as to show representation from the non-disconnection to the connection, the AXI protocol is taken over with its righteousness being held.

[Configuration of Slave Write Coherency Portion]

Figure 15:
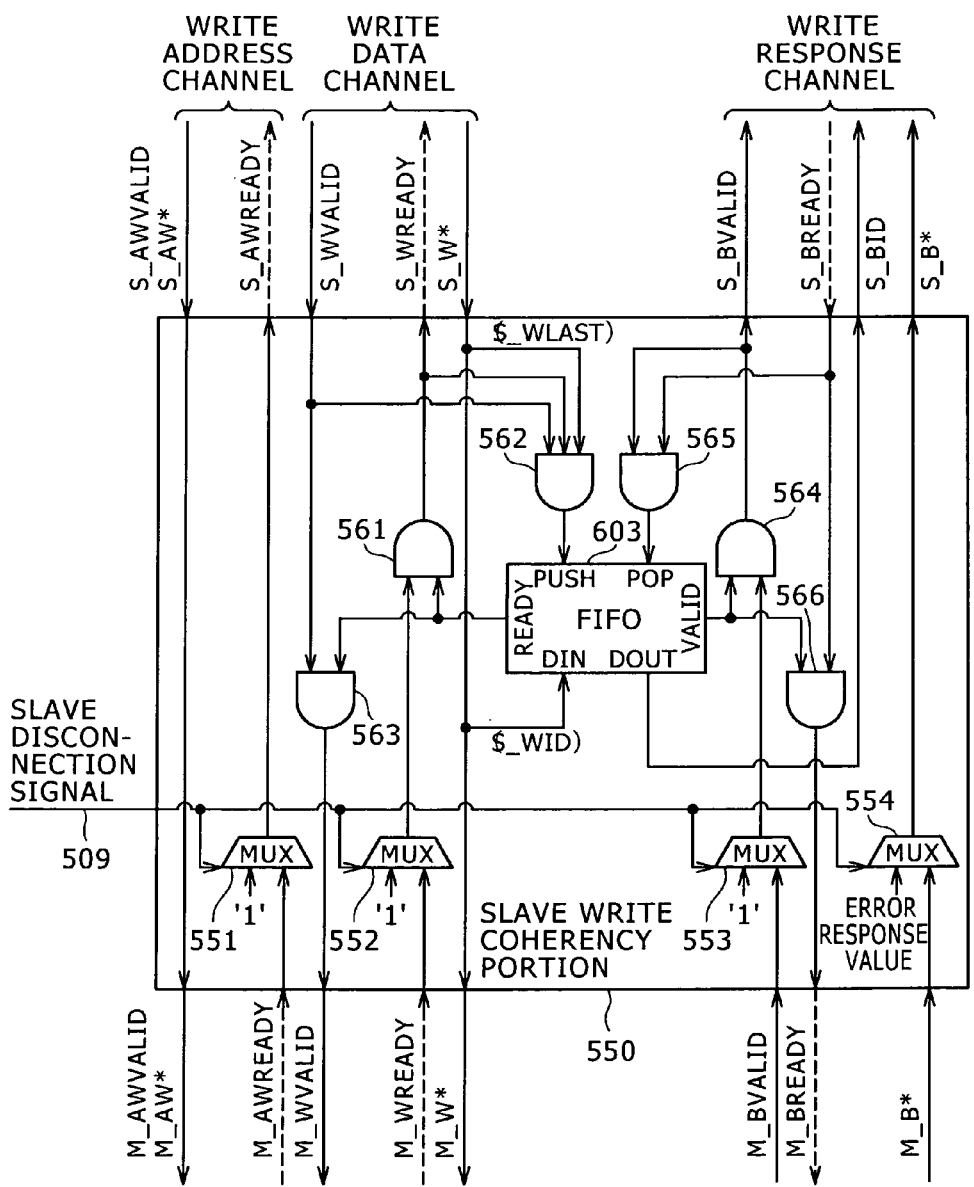
FIG. 15 is a circuit diagram showing a configuration of a slave write coherency portion in the bus system according to the first embodiment of the present disclosure.

FIG. 15 is a circuit diagram showing a configuration of the slave write coherency portion 550 in the first embodiment of the present disclosure. The slave write coherency portion 550 includes multiplexers 551 to 554, AND gates 561 to 566, and a FIFO 603.

Each of the multiplexers 551 to 554 serves to select any one of input signals in accordance with the slave disconnection signal 509, and outputs the input signal thus selected. The multiplexer 551 outputs a write address ready M_AWREADY signal when the slave disconnection signal 509 represents the non-disconnection (for example, "0"), and outputs a constant value "1" when the slave disconnection signal 509 represents the disconnection (for example, "1"). The output signal, that is, the write address ready M_AWREADY signal or the constant value "1" from the multiplexer 551 is outputted as a write address ready S_AWREADY signal.

The multiplexer 552 outputs a write ready M_WREADY signal when the slave disconnection signal 509 represents the non-disconnection, and outputs a constant value "1" when the slave disconnection signal 509 represents the disconnection. The output signal, that is, the write ready M_WREADY signal or the constant value "1" from the multiplexer 552 is inputted to one of two input terminals of the AND gate 561.

The multiplexer 553 outputs a write response valid M_BVALID signal when the slave disconnection signal 509 represents the non-disconnection, and outputs a constant value "1" when the slave disconnection signal 509 represents the disconnection. The output signal, that is, the write response valid M_BVALID signal or the constant value "1" from the multiplexer 553 is inputted to one of two input terminals of the AND gate 564.

The multiplexer 554 outputs signals M_B* other than the write response valid M_BVALID signal and the write ready M_BREADY signal of the write response channel as they are when the slave disconnection signal 509 represents the non-disconnection. On the other hand, the multiplexer 554 is set in such a way that an error response is shown with respect to the write response BRESP [1:0] signal of the signals M_B* when the slave disconnection signal 509 represents the disconnection. The meaning contents of the write response BRESP [1:0] signal are the same as those in the case of the read response RRESP [1:0] previously described with reference to FIG. 14.

The FIFO 603 is a buffer utilizing the FIFO system. Similarly to the case of the FIFO 601, the FIFO 603 has the function of the FIFO 600 shown in FIGS. 11A and 11B. The FIFO 603 includes at least one entry, and holds a write identifier tag S_WID signal in the write data channel in each of the entries. The write identifier tag WID signal held in the FIFO 603 is outputted as a response identifier S_BID in the write response channel. The number of entries held in the FIFO 603 is generally determined in consideration of the number of outstanding of the write address channel.

The AND gate 561 carries out a logical product (AND) arithmetic operation for the output signal from the multiplexer 552, and the READY output signal from the FIFO 603. An output signal from the AND gate 561 is outputted as a write ready S_WREADY signal. That is to say, the AND gate 561 is controlled in such a way that only when the READY output signal from the FIFO 603 shows the validity, the write ready S_WREADY signal represents "a state of being capable of being received."

The AND gate 562 carries out an AND arithmetic operation for the write valid S_WVALID signal, the output signal from the AND gate 561, and the write last S_WLAST signal in the write data channel. An output signal from the AND gate 562 is outputted to an input terminal PUSH of the FIFO 603. That is to say, the AND gate 562 is controlled in such a way that when the final data (final beat) in the burst transfer is transferred, the write identifier tag S_WID is fetched in.

The AND gate 563 carries out an AND arithmetic operation for the write valid S_WVALID signal, and the READY output signal from the FIFO 603. An output signal from the AND gate 563 is outputted as a write valid M_WVALID signal. That is to say, the AND gate 563 is controlled in such a way that only when a free space is left in the FIFO 603, the write valid M_WVALID signal is asserted.

The AND gate 564 carries out an AND arithmetic operation for the output signal from the multiplexer 553 and the VALID output signal from the FIFO 603. An output signal from the AND gate 564 is outputted as a write response valid S_BVALID signal. That is to say, the AND gate 564 is controlled in such a way that only when the valid data is held in the FIFO 603, the write response valid S_BVALID signal is asserted.

The AND gate 565 carries out an AND arithmetic operation for the write response valid S_BVALID signal, and the response ready S_BREADY signal. An output signal from the AND gate 565 is inputted to the input terminal POP of the FIFO 603. That is to say, the AND gate 565 is controlled in such a way that both of the write response valid S_BVALID signal, and the response ready S_BREADY signal are asserted to transmit the write response, the head write identifier tag WID [3:0] held in the FIFO 603 is drawn out.

The AND gate 566 carries out an AND arithmetic operation for the response ready S_BREADY signal, and the VALID output signal from the FIFO 603. An output signal from the AND gate 566 is outputted as a response ready M_BREADY signal. That is to say, the AND gate 566 is controlled in such a way that only when the valid data is held in the FIFO 603, the response ready M_BREADY signal is asserted.

[Operation of Slave Write Coherency Portion]

In this case, as the premise of the operation of the slave write coherency portion 550, it is supposed that a write data interleaving depth regulated in the AXI protocol is "1." This means that the write address issue order and the write data issue order are equal to each other.

A description will now be given with respect to the case where the slave disconnection signal represents the non-disconnection. At this time, the write address channel is transparent for the write address valid AWVALID, the write address ready AWREADY, and other signals AW*. Thus, the write address valid AWVALID, the write address ready AWREADY, and other signals AW* pass through the write address channel as they are. In addition, the write data channel is transparent for the signals W* other than the write valid WVALID and the write ready WREADY. Thus, the signals W* pass through the write data channel as they are.

When the transfer of the final data in the burst transfer of the signals W* containing therein the write data is established, that is, when all of the write valid WVALID, the write ready WREADY, and the write last WLAST are asserted to "1," the write identifier tag WID is fetched in the FIFO 603. When the free entry becomes absent in the FIFO 603, both of the write ready S_WREADY and the write valid M_WVALID become "0," and thus the establishment of the write data channel transfer is inhibited until the free entry becomes present in the FIFO 603.

Similarly to the case of the slave read coherency portion 510, in the slave write coherency portion 550 as well, the write address identifier M_AWID and the write identifier M_WID are set to the same fixed value, or the write address identifier M_AWID and the write identifier M_WID themselves are deleted. As a result, the write response signals B* to the write address signals AW* and the write data signals W* become unchangeable in order (in-order).

With regard to the write response channel, the response identifier S_BID is generated within the slave write coherency portion 550. The write response channel is transparent for the write response signals B* other than other write response valid BVALID and response ready BREADY. Thus, the write response signals B* pass through the write response channel as they are.

When the transfer of the write response is established, that is, when both of the write response valid BVALID and the response ready BREADY become "1," the identifier (fetched as the write identifier tag WID in the FIFO 603) is drawn out from the FIFO 603, and is then outputted as the response identifier B_BID. That is to say, the write identifier tag S_WID fetched in in the phase of establishment of the transfer of the final data in the write data is outputted to the output terminal DOUT of the FIFO 603 until end of the transfer of corresponding write response, and this output signal becomes the response identifier S_BID. When the FIFO 603 is empty, both of the write response valid S_BVALID and the response ready M_BREADY are set to "0," and thus the establishment of the write response channel transfer is inhibited until the valid entry is held.

When the master disconnection signal represents the disconnection, each of the multiplexers 551 to 554 selects the fixed value side. With regard to the write address channel and the write data channel, the write address ready M_AWREADY and the write ready M_WREADY are fixed to "1" by the multiplexers 551 and 552, respectively. As a result, the slave 200 acts like it can usually receive the write address AW* and the write data W* irrespective of the state of the slave 200. In addition, the write response valid M_BVALID is fixed to "1" by the multiplexer 553, and the write response BRESP of the write response is set to a fixed value "10" representing error information by the multiplexer 554. As a result, the slave 200 acts like it usually sends the write response B* in the form of a fixed value irrespective of the state of the slave 200.

In a word, when the slave disconnection signal 509 represents the disconnection, the slave write coherency portion 550 starts to respond to the sending source of the write address and the write data in place of the actual slave 200. Thus, all of the signals outputted from the slave 200 are disregarded. At this time, before and after the slave disconnection signal 509 is changed so as to show representation from the non-disconnection to the connection, the AXI protocol is taken over with its righteousness being held. However, the write response becoming the response becomes the fixed value representing the error information.

As described above, according to the first embodiment of the present disclosure, when either the master disconnection signal 409 or the slave disconnection signal 509 represents the disconnection, the response to the other party can be carried out in place of either the master 100 or the slave 200. As a result, the coherency on the protocol can be secured even when either the master 100 or the slave 200 is disconnected from the bus system.

2. Second Embodiment

Entire Configuration of Bus System

Figure 16:
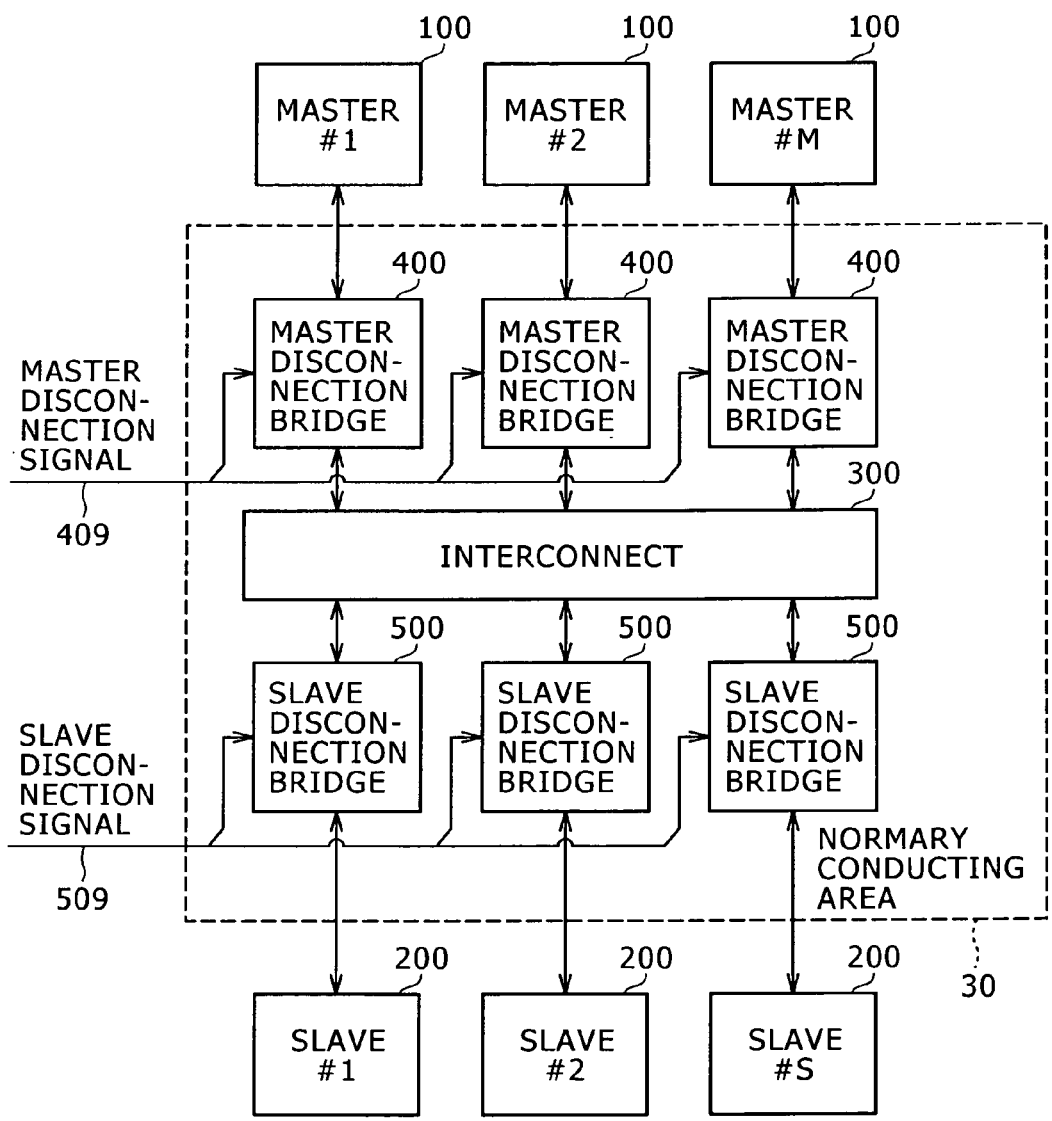
FIG. 16 is a block diagram showing an entire configuration of a bus system according to a second embodiment of the present disclosure.

FIG. 16 is a block diagram showing an entire configuration of a bus system according to a second embodiment of the present disclosure. A basic configuration of the bus system of the second embodiment is the same as that of the bus system of the first embodiment. However, the bus system of the second embodiment is different from the bus system of the first embodiment in that the interconnect 300, the master disconnection bridge 400, and the slave disconnection bridge 500 are all provided in a normally conducting area 30. That is to say, it is supposed that the power source is prevented from being disconnected from the interconnect 300, the master disconnection bridge 400, and the slave disconnection bridge 500 while the entire bus system is in operation. On the other hand, it is supposed that the power sources are individually connected to the master 100 and the slave 200 none of which is provided in the normally conducting area 30, and thus the power sources can be turned ON or OFF alone even while the bus system is in operation.

[Configuration of Master Disconnection Bridge]

Figure 17:
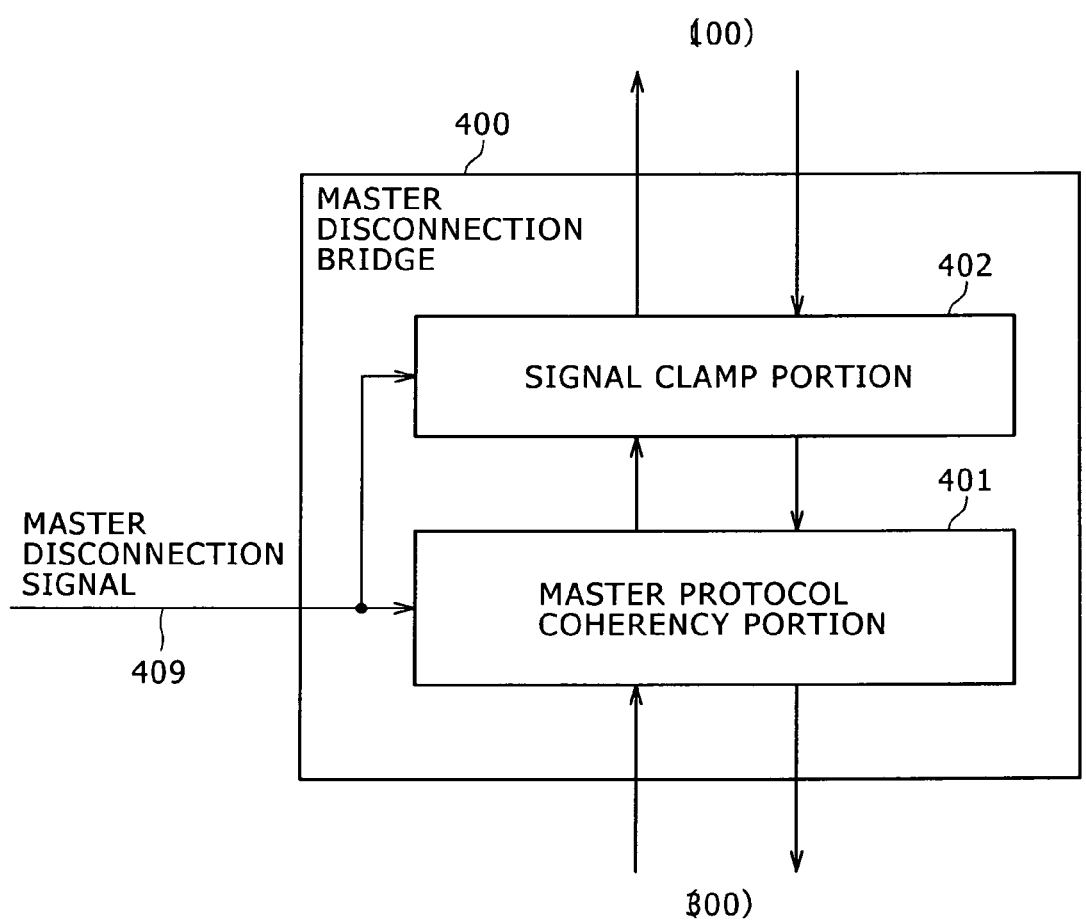
FIG. 17 is a block diagram showing a configuration of a master disconnection bridge in the bus system according to the second embodiment of the present disclosure.

FIG. 17 is a block diagram showing a configuration of a master disconnection bridge 400 in the bus system according to the second embodiment of the present disclosure. The master disconnection bridge 400 in the second embodiment of the present disclosure includes a signal clamp portion 402 in addition to the master protocol coherency portion 401.

The signal clamp portion 402 clamps the signal sent thereto from the master 100 in accordance with the state of the master disconnection signal 409. When the power sources are individually turned OFF for the masters 100, the input signals from the masters 100 become unstable states. In this case, there is the possibility that when the unstable input signals are transmitted to the master protocol coherency portion 401 as they are, the malfunction is caused. Also, there is also the possibility that a though current is caused to flow from the power source to the ground. In order to cope with this situation, when the master disconnection signal 409 represents the disconnection, the signal clamp portion 402 outputs a signal which is clamped either at a power source level or at the ground level. On the other hand, when the master disconnection signal 409 represents the non-disconnection, the signal clamp portion 402 outputs the input signal as an output signal as it is without clamping the input signal.

It is noted that a configuration of the master protocol coherency portion 401 is the same as that of the master protocol coherency portion 401 in the first embodiment.

[Configuration of Slave Disconnection Bridge]

Figure 18:
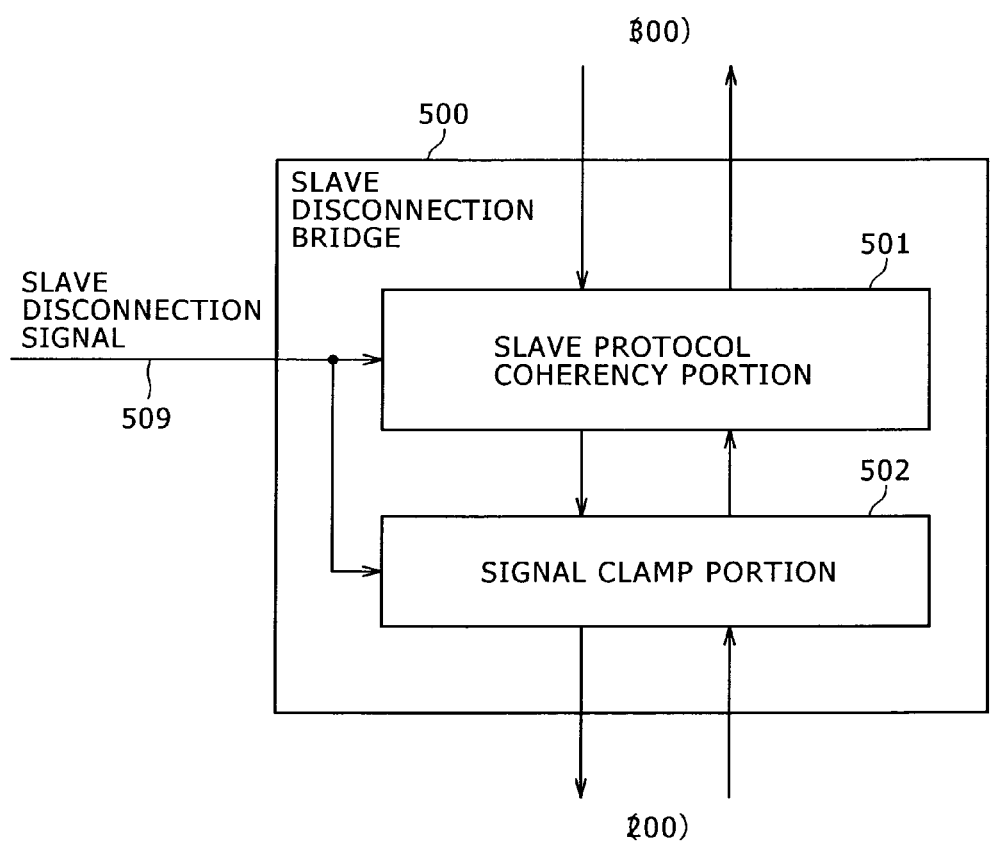
FIG. 18 is a block diagram showing a configuration of a slave disconnection bridge in the bus system according to the second embodiment of the present disclosure.

FIG. 18 is a block diagram showing a configuration of a slave disconnection bridge 500 in the bus system according to the second embodiment of the present disclosure. The slave disconnection bridge 500 in the second embodiment of the present disclosure includes a signal clamp portion 502 in addition to the slave protocol coherency portion 501.

The signal clamp portion 502 clamps the signal sent thereto from the slave 200 in accordance with the state of the slave disconnection signal 509. The signal clamp portion 502 is provided in order to dissolve the inconvenience as described above in the case where when the power sources are individually turned OFF for the slaves 200, the input signals from the slaves 200 become the unstable states. That is to say, when the slave disconnection signal 509 represents the disconnection, the signal clamp portion 502 outputs a signal which is clamped either at a power source level or at the ground level. On the other hand, when the master disconnection signal 509 represents the non-disconnection, the signal clamp portion 502 outputs the input signal as an output signal as it is without clamping the input signal.

It is noted that a configuration of the slave protocol coherency portion 501 is the same as that of the master protocol coherency portion 401 in the first embodiment.

[Configuration of Signal Clamp Portion]

Figure 19A:
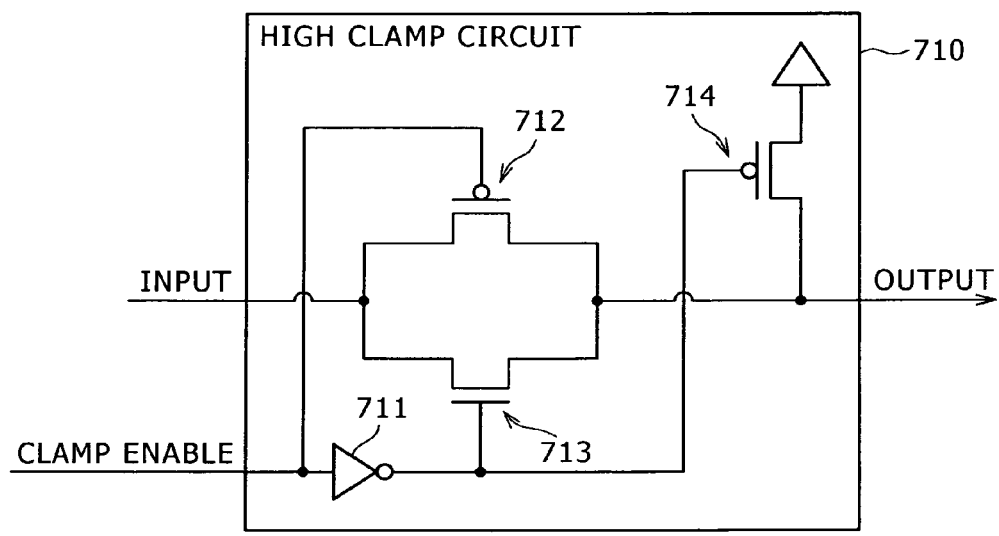
FIGS. 19A and 19B are respectively circuit diagrams showing configurations of a high clamp circuit and a low clamp circuit in the bus system according to the second embodiment of the present disclosure.
Figure 19B:
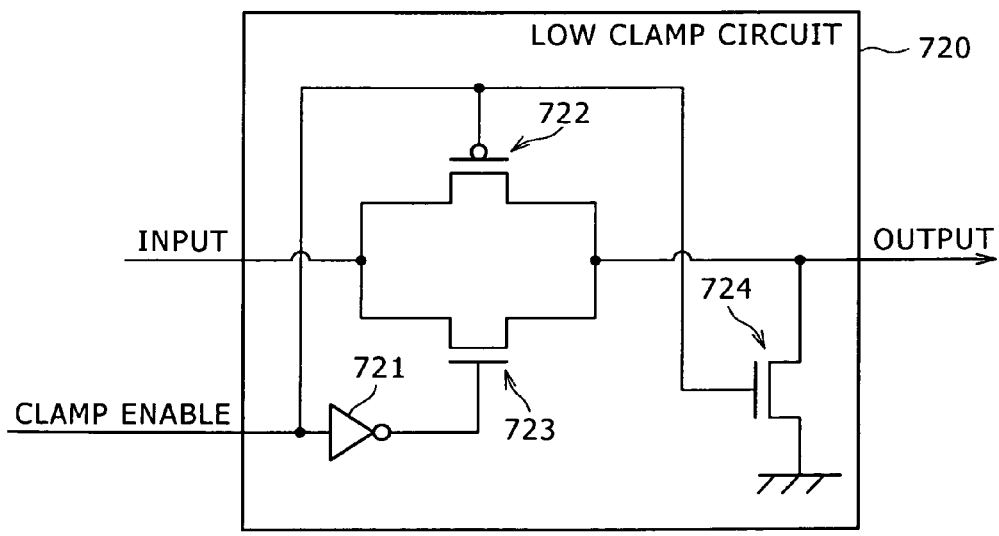

FIGS. 19A and 19B are circuit diagrams showing configurations of a high clamp circuit and a low clamp circuit, which are used in the signal clamp portions 402 and 502, in the bus system according to the second embodiment of the present disclosure. FIG. 19A is a circuit diagram showing a configuration of the high clamp circuit 710, and FIG. 19B is a circuit diagram showing a configuration of the low clamp circuit 720. Which of the high clamp circuit 710 and the low clamp circuit 720 is used depends on the signal level supposed either in the master protocol coherency portion 401 or in the slave protocol coherency portion 501. Preferably, the setting is carried out in such a way that when the power source of either the master 100 or the slave 200 becomes the OFF state, each of the signals becomes a non-active state. For example, in the case of the read address channel, the configuration is made in such a way that when the power source of the master 100 becomes the OFF state, the read address valid ARVALID is asserted to "0."

The high clamp circuit 710 is a circuit which outputs the input signal as the output signal as it is when a clamp enable signal is held at an L level, and clamps the output signal at a power source level (at an H level) when the clamp enable signal is held at the H level. The high clamp circuit 710 includes an inverter 711 and transistors 712 to 714.

The inverter 711 is a circuit which inverts the clamp enable signal inputted thereto. As a result, the clamp enable signal itself is supplied to a gate terminal of the transistor 712, while an inverted signal of the clamp enable signal is supplied to a gate terminal of the transistor 713.

The transistors 712 and 713 compose a pair of switches. That is to say, both of the transistors 712 and 713 cause the input signal to pass through them when the clamp enable signal is at the L level, but do not cause the input signal to pass through them when the clamp enable signal is at the H level.

The transistor 714 is a switch which switches whether or not an input voltage at the output terminal is clamped at the power source level. That is to say, the transistor 714 is turned OFF when the clamp enable signal is at the L level, and thus outputs the signal from the transistors 712 and 713 as an output signal. On the other hand, the transistor 714 is turned ON when the clamp enable signal is at the H level, and the output signal is clamped at the power source level.

The low clamp circuit 720 is a circuit which outputs the input signal as the output signal as it is when a clamp enable signal is held at an L level, and clamps the output signal at a power source level (at an H level) when the clamp enable signal is held at the H level. The low clamp circuit 710 includes an inverter 721 and transistors 722 to 724.

The inverter 721 is a circuit which inverts the clamp enable signal inputted thereto. As a result, the clamp enable signal itself is supplied to a gate terminal of the transistor 722, while an inverted signal of the clamp enable signal is supplied to a gate terminal of the transistor 723.

The transistors 722 and 723 compose a pair of switches. That is to say, both of the transistors 722 and 723 cause the input signal to pass through them when the clamp enable signal is at the L level, but do not cause the input signal to pass through them when the clamp enable signal is at the H level.

The transistor 724 is a switch which switches whether or not an input voltage at the output terminal is clamped at the power source level. That is to say, the transistor 724 is turned OFF when the clamp enable signal is at the L level, and thus outputs the signal from the transistors 722 and 723 as an output signal. On the other hand, the transistor 724 is turned ON when the clamp enable signal is at the H level, the output signal is clamped at the ground level.

Such a clamp circuit can be configured in such a way that when the master disconnection signal 409 is inputted as the clamp enable signal, the signal sent from corresponding master 100 is clamped either at the power source level or at the ground level when the corresponding master 100 is disconnected from the bus system. In addition, such a clamp circuit can be configured in such a way that when the slave disconnection signal 509 is inputted as the clamp enable signal, the signal sent from corresponding slave 200 is clamped either at the power source level or at the ground level when the corresponding slave 200 is disconnected from the bus system.

As described above, according to the second embodiment of the present disclosure, when either the master disconnection signal 409 or the slave disconnection signal 509 represents the disconnection, the signal either from the master 100 or from the slave 200 can be clamped either at the power source level or at the ground level. Therefore, when either the master 100 or the slave 200 is disconnected from the bus system, the signal can be stabilized, and thus the malfunction of the circuit can be prevented from being caused before the something happens.

As has been described so far, according to the embodiments of the present disclosure, either the master 100 or the slave 200 can be disconnected from the bus system at the arbitrary timing. As a result, when either the master 100 or the slave 200 does not make a response due to the hanging-up, either the corresponding master 100 or slave 200 is disconnected from the bus system by itself. Thus, the access which has been unable to be completed can be completed in accordance with the normal protocol. On the other hand, any of the portions other than the disconnection portion can continue to be operated. As a result, it is possible to enhance the failure resistance properties.

In addition, according to the embodiments of the present disclosure, the power source of either the master 100 or the slave 200 which needs not to be operated is turned OFF, thereby making it possible to reduce the power consumption. At this time, even when either the master 100 or the slave 200 is in the middle of the access, either the master 100 or the slave 200 can be disconnected from the bus system while the normal protocol is continued. Even when the slave 200 after completion of the disconnection is accessed, the slave disconnection bridge 500 responds to the access. Therefore, even after completion of the disconnection, the normal protocol is normally continued.

In addition, in the embodiments of the present disclosure, either the master 100 or the slave 200 which had been disconnected from the bus system can be readily reconnected to the bus system. That is to say, either the master 100 or the slave 200 which had been hanged up to make no response is reset after completion of the disconnection to become the state of being capable of being operated. After that, either the master disconnection signal 409 or the slave disconnection signal 509 is switched over to the non-disconnection, thereby making it possible to get an access again. In addition, after either the master 100 or the slave 200 whose power source had been turned OFF becomes the state of being capable of being operated by turning ON the power source and carrying out the resetting, either the master disconnection signal 409 or the slave disconnection signal 509 is switched over to the non-disconnection, thereby making it possible to get an access again.

It is noted that although the embodiments of the present disclosure have been described on the assumption of the AXI protocol, the present disclosure is by no means limited thereto, and thus can be applied across the board of the buses each permitting the split transaction. An Open Core Protocol (OCP), a Processor Local Bus (PLB) and the like, for example, are given as other examples of such buses.

It should be noted that the embodiments of the present disclosure show merely examples for embodying the present disclosure, and as clearly specified in the embodiments of the present disclosure, the matters in the embodiments of the present disclosure, and the disclosure specifying matters in the appended claims have correspondence relationships, respectively. Likewise, the disclosure specifying matters in the appended claims, and the matters in the embodiments of the present disclosure added with the same names as those in the disclosure specifying matters in the appended claims have correspondence relationships, respectively. However, the present disclosure is by no means limited to the embodiments, and thus can be embodied by making various changes with respect to the embodiments without departing from the subject matter of the present disclosure.

The present application contains subject matter related to that disclosed in Japanese Priority Patent Application JP 2010-183762 filed in the Japan Patent Office on Aug. 19, 2010, the entire content of which is hereby incorporated by reference.

What is claimed is:

1. A bus system, comprising:
a first connection apparatus and a second connection apparatus configured to carry out an exchange in accordance with a predetermined protocol;
a bus that connects said first and second connection apparatuses; and
a bridge, between said first connection apparatus and said bus, configured to carry out an exchange with said second connection apparatus in accordance with the predetermined protocol instead of said first connection apparatus when the bridge receives a disconnection instruction for said first connection apparatus,
wherein said first connection apparatus is configured to execute a leading role in the exchange with said second connection apparatus, and said second connection apparatus is configured to passively operate during the exchange with said first connection apparatus, and
wherein when said bridge receives the disconnection instruction for said first connection apparatus, said bridge stops an issuance of a command from said first connection apparatus, and permits reception of an input from said second connection apparatus.

2. The bus system according to claim 1, wherein the command is a read address, and wherein the input is read data.

3. The bus system according to claim 1, wherein the command is a write address, and the input is a write response.

4. The bus system according to claim 3, wherein said bridge is configured to write data being burst-transferred until end of the burst transfer.

5. A bus system, comprising:
a first connection apparatus and a second connection apparatus configured to carry out an exchange in accordance with a predetermined protocol;
a bus that connects said first and second connection apparatuses; and
a bridge, between said first connection apparatus and said bus, configured to carry out an exchange with said second connection apparatus in accordance with the predetermined protocol instead of said first connection apparatus when the bridge receives a disconnection instruction for said first connection apparatus,
wherein said second connection apparatus is configured to execute a leading role in the exchange with said first connection apparatus, and said first connection apparatus is configured to passively operate during the exchange with said second connection apparatus.

6. The bus system according to claim 5, wherein when said bridge receives the disconnection instruction for said first connection apparatus, said bridge permits reception of a read address from said second connection apparatus, and sends a fixed value representing error information back to said second connection apparatus.

7. The bus system according to claim 5, wherein when said bridge receives the disconnection instruction for said first connection apparatus, said bridge permits reception of a write address from said second connection apparatus, and sends a fixed value representing error information back to said second connection apparatus.

8. A bus system, comprising:
a first connection apparatus and a second connection apparatus configured to carry out an exchange in accordance with a predetermined protocol;
a bus that connects said first and second connection apparatuses; and
a bridge, between said first connection apparatus and said bus, configured to carry out an exchange with said second connection apparatus in accordance with the predetermined protocol instead of said first connection apparatus when the bridge receives a disconnection instruction for said first connection apparatus,
wherein when said bridge receives the disconnection instruction for said first connection apparatus, said bridge clamps a signal from said first connection apparatus at a predetermined level, and
wherein the bridge includes a signal clamp portion configured to clamp the signal.

9. A bridge circuit that is between a first connection apparatus and a bus that is connected to a second connection apparatus, the bridge being configured to:
receive a disconnection instruction for the first connection apparatus;
execute an exchange with the second connection apparatus in accordance with a predetermined protocol instead of the first connection apparatus based on the disconnection instruction,
wherein the second connection apparatus is configured to passively operate during the exchange, and
wherein when the bridge receives the disconnection instruction for the first connection apparatus, the bridge stops an issuance of a command from the first connection apparatus and permits reception of an input from the second connection apparatus.

* * * * *